(12) United States Patent
Blakesley et al.

(10) Patent No.: US 7,222,545 B2
(45) Date of Patent: May 29, 2007

(54) SEAT BELT TENSION SENSOR HAVING SHOCK ISOLATION

(75) Inventors: Patrick B. Blakesley, Goshen, IN (US); Robert R. Rainey, Elkhart, IN (US); Murray Kaijala, Elkhart, IN (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 11/288,856

(22) Filed: Nov. 29, 2005

(65) Prior Publication Data

US 2006/0075832 A1 Apr. 13, 2006

Related U.S. Application Data

(63) Continuation of application No. 10/388,816, filed on Mar. 14, 2003, now Pat. No. 7,086,297, which is a continuation-in-part of application No. 09/923,151, filed on Aug. 6, 2001, now Pat. No. 6,578,432, which is a continuation of application No. 09/884,615, filed on Jun. 19, 2001, now Pat. No. 6,647,811.

(51) Int. Cl.
*G01L 1/26* (2006.01)
*G01L 5/04* (2006.01)

(52) U.S. Cl. .................................... 73/862.391
(58) Field of Classification Search ............ 73/862.391
See application file for complete search history.

(56) References Cited

U.S. PATENT DOCUMENTS

| | | | |
|---|---|---|---|
| 6,447,010 B1 * | 9/2002 | Curtis et al. ............ | 280/801.1 |
| 6,508,114 B2 * | 1/2003 | Lawson .................... | 73/159 |
| 6,520,540 B1 * | 2/2003 | Siegfried et al. ........ | 280/801.1 |
| 6,647,811 B2 * | 11/2003 | Blakesley et al. ..... | 73/862.391 |
| 6,662,670 B2 * | 12/2003 | Clark .................... | 73/862.391 |
| 6,749,038 B2 * | 6/2004 | Sullivan et al. ........... | 180/268 |
| 6,860,160 B2 * | 3/2005 | Curtis et al. .......... | 73/862.391 |
| 6,903,286 B2 * | 6/2005 | Kaijala et al. ........... | 200/85 A |
| 7,086,297 B2 * | 8/2006 | Blakesley et al. ..... | 73/862.474 |

* cited by examiner

*Primary Examiner*—Michael Cygan
*Assistant Examiner*—O. Davis
(74) *Attorney, Agent, or Firm*—Mark P. Bourgeois

(57) ABSTRACT

A seat belt tension sensor assembly is adapted to be secured to the seat belt assembly of a vehicle. The assembly includes a housing for a seat belt anchor adapted for movement relative to the housing into an overload position where a portion of the anchor is abutted against a portion of the housing to limit and arrest the movement of the anchor relative to the housing and transfer the load from the anchor to the housing and then to an interior structure of the vehicle. In one embodiment, the housing forms a collar and the anchor includes an interior wall defining an aperture through which the collar extends when the anchor is mounted to the housing. Movement of the anchor relative to the housing is limited as a result of the contact between the interior anchor wall and the collar.

22 Claims, 21 Drawing Sheets

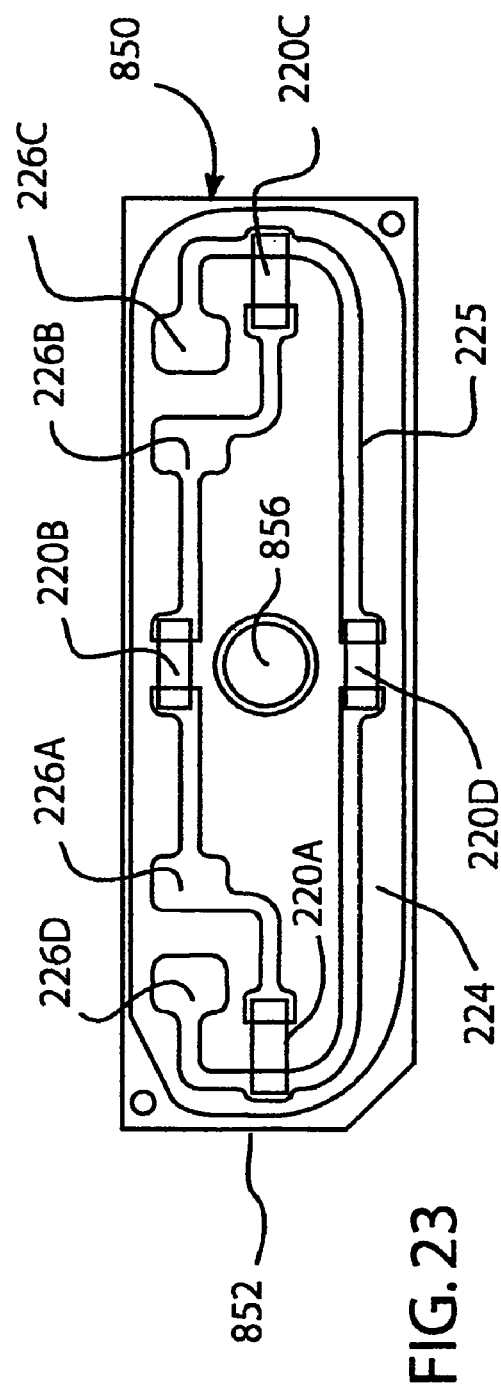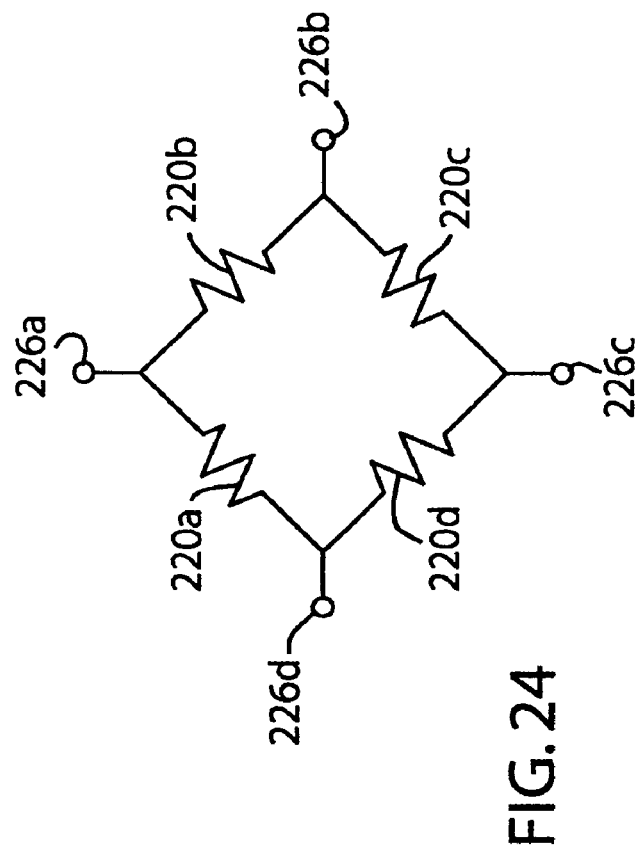
FIG. 23
FIG. 24

SEAT BELT TENSION SENSOR HAVING SHOCK ISOLATION

CROSS REFERENCE TO RELATED AND CO-PENDING APPLICATIONS

This application is a continuation of U.S. patent application Ser. No. 10/388,816 filed Mar. 14, 2003 and titled, "Seat Belt Tension Sensor Having Shock Isolation", now U.S. Pat. No. 7,086,297, which is a continuation-in-part of U.S. patent application Ser. No. 09/923,151 filed Aug. 6, 2001 and titled, "Seat Belt Tension Sensor", now U.S. Pat. No. 6,578,432, which is a continuation of U.S. patent application Ser. No. 09/884.615 filed Jun. 19, 2001 and titled. "Seat Belt Tension Sensor", now U.S. Pat. No. 6,647,811.

This application is related to the following U.S. patent applications:

U.S. patent application Ser. No. 09/884,615, filed Jun. 19, 2001 and titled, "Seat Belt Tension Sensor With Overload Protection".

U.S. patent application Ser. No. 10/202,727, filed Jul. 25, 2002 and titled, "Hall Effect Seat Belt Tension Sensor".

U.S. patent application Ser. No. 10/185,242, filed Jun. 28, 2002 and titled, "Seat Belt Tension Sensor".

U.S. patent application Ser. No. 09/441,350, filed Nov. 15, 1999 and titled, "Automobile Seat Having Seat Supporting Brackets with a Stepped Weight Sensor".

U.S. patent application Ser. No. 09/374,874, filed Aug. 16, 1999 and titled, "Automobile Seat Weight Sensor".

U.S. patent application Ser. No. 09/374,870, filed Aug. 16, 1999 and titled, "Vehicle Occupant Position Detector and Airbag Control System".

U.S. patent application Ser. No. 09/422,382, filed Oct. 21, 1999 and titled, "Vehicle Seat Weight Sensor".

U.S. Pat. No. 6,209,915, issued Apr. 3, 2001 and titled, "Seat Belt Tension Sensor".

U.S. Pat. No. 6,450,534, issued Sep. 17, 2002 and titled, "Seat Belt Tension Sensor".

The foregoing patents have the same assignee as the instant application and are herein incorporated by reference in their entirety for related and supportive teachings.

BACKGROUND OF THE INVENTION

1. Field of the Invention

This invention relates to an automobile sensor for detecting and limiting the magnitude of a tensile force in a seat belt used in a car seat, and in particular to a sensor that can detect and limit the magnitude of tension in a seat belt and provide an electrical signal that is representative of the magnitude of tensile force.

2. Description of the Related Art

Air bags have been heralded for their ability to reduce injuries and save lives. However, since their incorporation into automobiles, a problem has existed with people of smaller size and small children. Air bags are designed to cushion the impact of occupants and thus reduce the injuries suffered. However, the force needed to properly cushion the occupant varies based on the size and position of the person.

For example, a larger person requires the bag to inflate faster and thus with more force. A smaller person may be injured by a bag inflating at this higher inflation force. A smaller person is more likely to be sitting close to the dashboard and would therefore stand a higher chance of being injured by the impact of the inflating bag, as opposed to the passenger hitting the fully inflated bag to absorb the impact of the accident. An average-sized person can also be injured by an airbag inflation if they are leaning forward, as for example, if they are adjusting the radio.

Because of the concern over injury to passengers in these situations, the National Highway Transportation Safety Administration (or NHTSA), an administrative agency of the United States, is instituting rules requiring the air bag deployment system to identify the passenger size and position and inflate the air bag accordingly.

One way to accomplish this task is to use a seat belt tension sensor in conjunction with an occupant weight sensor. The weight sensor can provide an indication of the force placed by an occupant on the seat. However, if the seat belt is unduly tightened, it can place an additional downward force on the passenger, creating an erroneous weight reading. Similarly, it is common for infant car seats to be secured tightly to the seat. In this circumstance, it is critical for the system to recognize that the passenger does not warrant inflation of the air bag. By sensing the tension on the seat belt in addition to the weight reading from the seat, the actual weight of the occupant can be determined. This allows for the system to safely deploy the air bag.

SUMMARY OF THE INVENTION

The present invention is directed to a seat belt tension sensor assembly which comprises a housing for a seat belt anchor. The anchor is adapted to be fitted in the housing and defines a slot for a seat belt. The anchor is adapted for movement relative to the housing in response to a load exerted thereto by the seat belt. The housing and anchor define respective walls adapted to engage each other to arrest the movement of the anchor relative to the housing.

In one embodiment, the housing wall defines a collar and the anchor wall defines an aperture. The collar extends through the aperture when the anchor is fitted in the housing and the wall defining the aperture is adapted to move into abutting relationship with the collar wall to arrest the movement of the anchor relative to the housing.

The housing also defines an aperture adapted to receive a fastener for securing the housing to an interior vehicle structure and transferring the load successively from the anchor, to the housing, to the fastener, and then to the vehicle interior structure following the engagement of the respective anchor and housing walls in the overload situation.

A sensor is adapted to generate an electrical signal in response to the movement of the anchor relative to the housing. A spring is associated with the anchor and adapted for compression in response to the movement of the anchor relative to the housing. A wire harness is also connected to the sensor.

BRIEF DESCRIPTION OF THE DRAWINGS

FIG. 23 is a front elevational view of the strain gage of the sensor of FIG. 17.

FIG. 24 is a schematic diagram of the wheatstone bridge circuit of the sensor of FIG. 17.

It is noted that the drawings of the invention are not to scale.

DETAILED DESCRIPTION OF THE PREFERRED EMBODIMENTS

Figure 1:
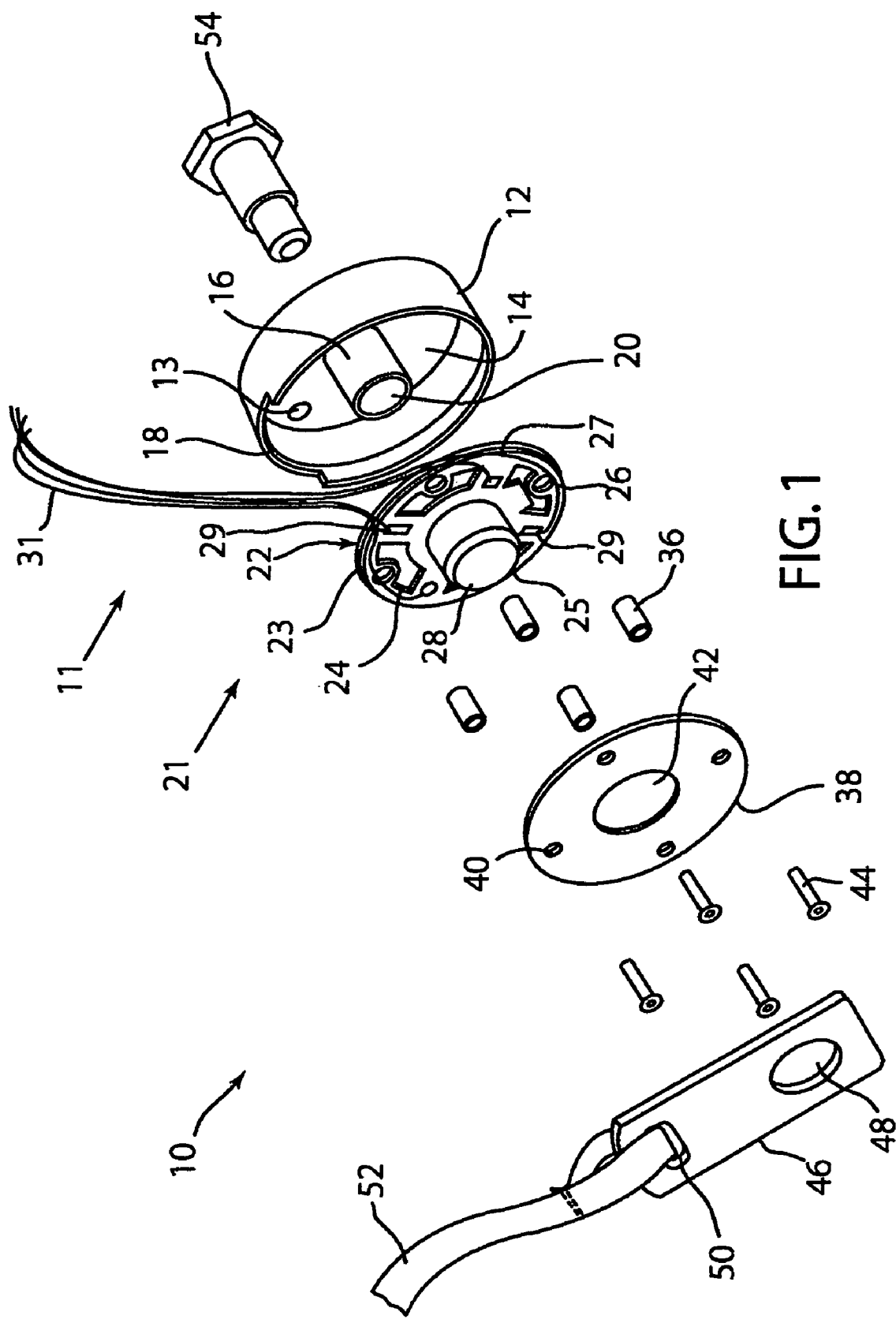
FIG. 1 is a perspective exploded view of one embodiment of a seat belt tension sensor in accordance with the present invention.
Figure 3:
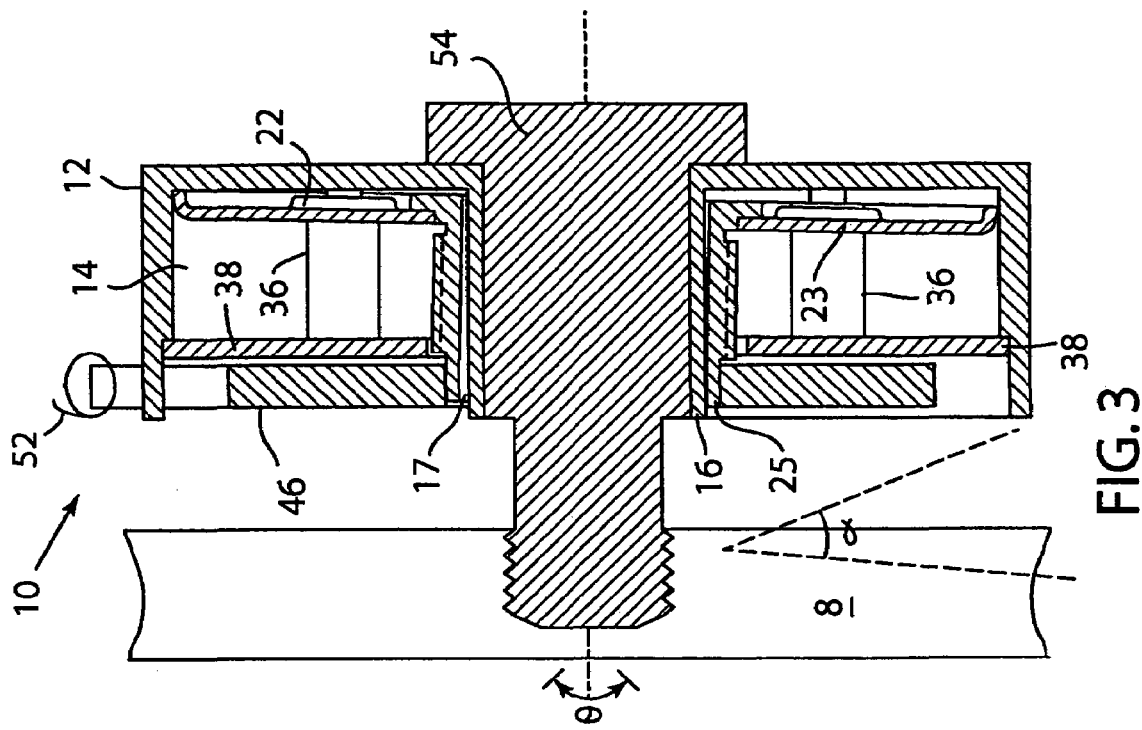
FIG. 3 is another vertical cross-sectional view of the sensor of FIG. 1 in an assembled state.
Figure 2:
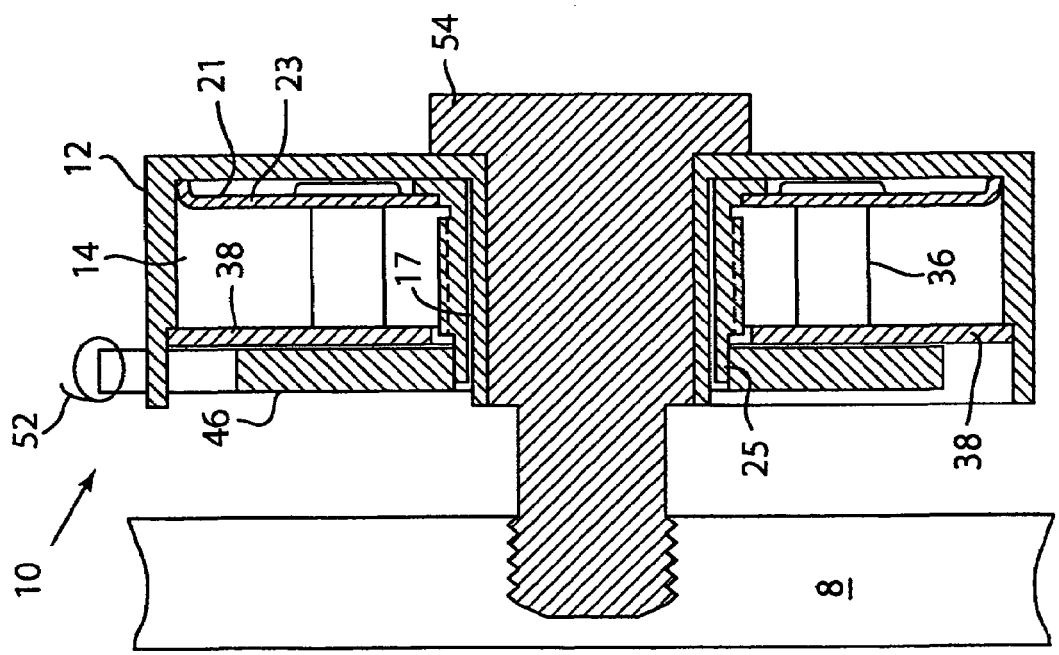
FIG. 2 is a vertical cross-sectional view of the sensor of FIG. 1 in an assembled state.

The present invention is a seat belt tension sensor. FIGS. 1, 2 and 3 show a first embodiment of a seat belt tension sensor assembly 10. Assembly 10 has a limit structure 11 and a sensor 21. Limit structure 11 is fastened between seat belt components. For example, structure 11 can be attached to an anchor plate 46 that is attached to a seat belt webbing 52 and to a vehicle seat or floor 8 (FIG. 2) by fastener or bolt 54.

Limit structure 11 has a housing 12 with a cavity 14. A cylindrical flange 16 extends into cavity 14 and includes a hollow center portion 20. A recess 18 is provided on one side of housing 12 to allow anchor plate 46 to extend beyond housing 12. A circular hub 22 has a flat disc-shaped portion 23, and a cylindrical rim 25 attached to and extending from the disc-shaped portion 23. The rim 25 has an aperture 28 passing therethrough. Several slots 24 are located on disc 23. Several screw apertures 26 are also located in disc 23. Disc 23 has several arms 27 that each have a strain gage resistor 29 mounted thereon. Hub 22 is fitted over flange 16 and creates a gap 17 between the rim and flange as shown in FIG. 2.

A cover 38 goes over housing 12 and is retained on housing 12 by screws 44 or other fasteners that pass through screw apertures 26 and into threaded bores 13 in housing 12. Cover 38 has screw apertures 40 and a central opening 42. Several springs 36 are located between cover 38 and disc portion 23. Anchor plate 46 defines a mounting aperture 48 adapted to receive rim 25. Plate 46 also defines a slot 50 through which seat belt webbing 52 passes. Webbing 52 would typically be looped through slot 50 and then sewed onto itself to securely fasten the webbing to the plate 46.

After assembly, threaded fastener or bolt 54 extends through hollow center portion 20, rim aperture 28, central opening 42 and mounting aperture 48 and mates with threads in a vehicle floor or seat 8. Fastener 54 is a conventional fastener such as a hex-headed bolt, Allen head screw, shoulder screw or rivet.

Sensor 21 includes the hub 22, disc portion 23 and rim 25. Hub 22 is preferably formed from 430 stainless steel. Several strain gage resistors 29 are arranged on arms 27 around rim 25. Details of the construction and operation of resistors 29 are shown in U.S. patent application Ser. No. 09/441,350, filed Nov. 15, 1999 and titled, "Automobile Seat Having Seat Supporting Brackets with a Stepped Weight Sensor".

Resistors 29 would typically be connected in a conventional wheatstone bridge configuration. Resistors 29 are strain-sensitive and will change resistance based on the amount of strain in arms 27. A wiring harness 31 is adapted to connect resistors 29 to an external electrical circuit.

Referring to FIG. 2, which shows a normal load state for the present invention with an occupant sitting in a vehicle seat and buckled to a seat belt, the tension placed in the seat belt is transferred from webbing 52 to buckle plate 46 to sensor 21 through rim 25 and disc 23. The force is transferred from disc 23 through springs 36 to cover 38 and housing 12, then to floor 8 through fastener 54. In this state, two of the springs 36 are compressed against disc 23, while two of the springs 36 are in tension. An electrical output signal is generated by the resistors 29 that is proportional to the magnitude of the tension in the seat belt and is transmitted over a wire harness 31 to a conventional air bag controller (not shown). The air bag controller can then use the seat belt tension information to compute a more accurate profile of the seat occupant and use that information to control deployment of the airbag. This is the normal operational state of the seat belt tension sensor in which all of the seat belt tension is carried through the sensor 21.

In a situation where the vehicle is involved in a crash, the seat belt tension sensor operates in a different mode called a high load or crash state as shown in FIG. 3. In the high load state, the limit structure carries the tension placed on the seat belt. The amount of tension in the seat belt in a crash situation is much larger than in normal operation. If the hub 22 was designed to carry all of this tension, it would not flex enough to properly function as a strain gage sensor. Therefore, in a crash situation, the limit structure carries the tension through the much stronger limit structure 11. As the tension in the seat belt increases, the hub 22 rotates or tilts until rim 25 contacts flange 16 providing a positive stop. The seat belt tension is then transferred through buckle plate 46 to rim 25, flange 16, bolt 54 and then to the vehicle floor or seat frame 8. The limit structure 11 is designed so as not to deform under the load placed on it by the seat occupant during a crash situation.

Remarks About the Preferred Embodiments

The seat belt tension sensor has several advantages. It allows accurate sensing of seat belt tension, while at the same time providing the structural strength needed for occupant restraint in a crash situation. The seat belt tension sensor allows an airbag controller to make better decisions as to when and how to deploy an airbag based upon more accurate seat occupant information. In the case of a child's car seat being strapped into a car seat, the seat belt tension sensor in conjunction with a seat weight sensor allows the airbag controller to properly compute that the seat occupant has a low weight and to prevent deployment of the airbag.

The gap between the hub and the housing flange is the travel range of the sensor as it is actuated. This design solves four main problems. 1) Maintaining sensitivity at low loads without damage at higher loads. 2) Maintaining restraint system integrity. 3) Integration into multiple restraint systems. 4) Reading correctly over a wide range of strain angles. A theta angle represents rotation about the axis of the bolt. An alpha angle represents tilt toward and away from the seat.

1) Maintaining Sensitivity at Low Loads without Damage at Higher Loads

When the gap between the rim and the flange is closed, the load applied to the strain sensor elements reaches its limit. After this, the load is transferred to the bolt. Limiting the maximum load applied to the strain sensor is necessary since the working range of the sensor is generally below 100 lbs. The sensor must, however, withstand large (often greater than 1,000 lb.) loads without damage and must not compromise the integrity of the passenger restraint system.

Springs 36 can be omitted if desired. Springs 36 are added to allow larger motions. These springs apply a load, which holds the hub 22 in place until a designed actuation force is reached. Once this force is exceeded, the springs allow the hub to move. This both limits the applied load and allows for looser tolerances between the limit structure 11 and the shoulder bolt 54.

2) Maintaining Restraint System Integrity

The present design allows the use of the same or very similar mounting bolts and anchors and mounting technique as do current seatbelt attachment methods. Thus, safety engineers are very familiar with the requirements of the attachment method and installation procedures are changed as little as possible.

3) Integration into Multiple Restraint Systems

This present invention allows the sensor to be attached at the most common point of a wide variety of belt systems. It is useable even with very short bolt-to-buckle distances. The only changes required in some installations are a larger mounting aperture in the anchor and a longer bolt to allow for the thickness of the device. The shoulder bolt is used as the stop. A tube through which the bolt passes could also be used as a stop. The advantage of this design is that it does not require a shoulder bolt with the correct shoulder length and diameter for the device to operate. A standard bolt may be used. This improves field serviceability.

4) Reading Correctly over a Wide Range of Theta and Alpha Angles

Theta represents rotation about the axis of the bolt. Alpha represents tilt toward and away from the seat. The attachment to the floor may be fixed or, more likely, the sensor would be free to rotate and tilt plus or minus several degrees. This freedom of movement allows the sensor to respond only to tension on the seatbelt while accommodating user needs. The cross-style sensor design allows the tension load to be applied at a fairly wide range of theta angles with only small changes in sensitivity. This allows the sensor to rotate (theta) normally to accommodate passenger needs. If desired, the sensor can rotate around the bolt axis in order that its sensing elements could remain aligned with the direction of the pull throughout the normal rotation limit of the anchor. This could allow the use of simplified sensor element designs.

The sensor 21 may also be shaped such that only tension is sensed and compression is ignored. This is accomplished by removing one or more arms 27 on the "top" side of the sensor. In the event that the angle of tension application is desired, the sensor can be constructed so that the alpha angle is reported as if it were tension; or another separate strain gage, or potentiometric sensors or the like can be used to report the angle(s) (alpha and/or theta) at which the tension load is applied.

First Alternative Embodiment

Figure 4:
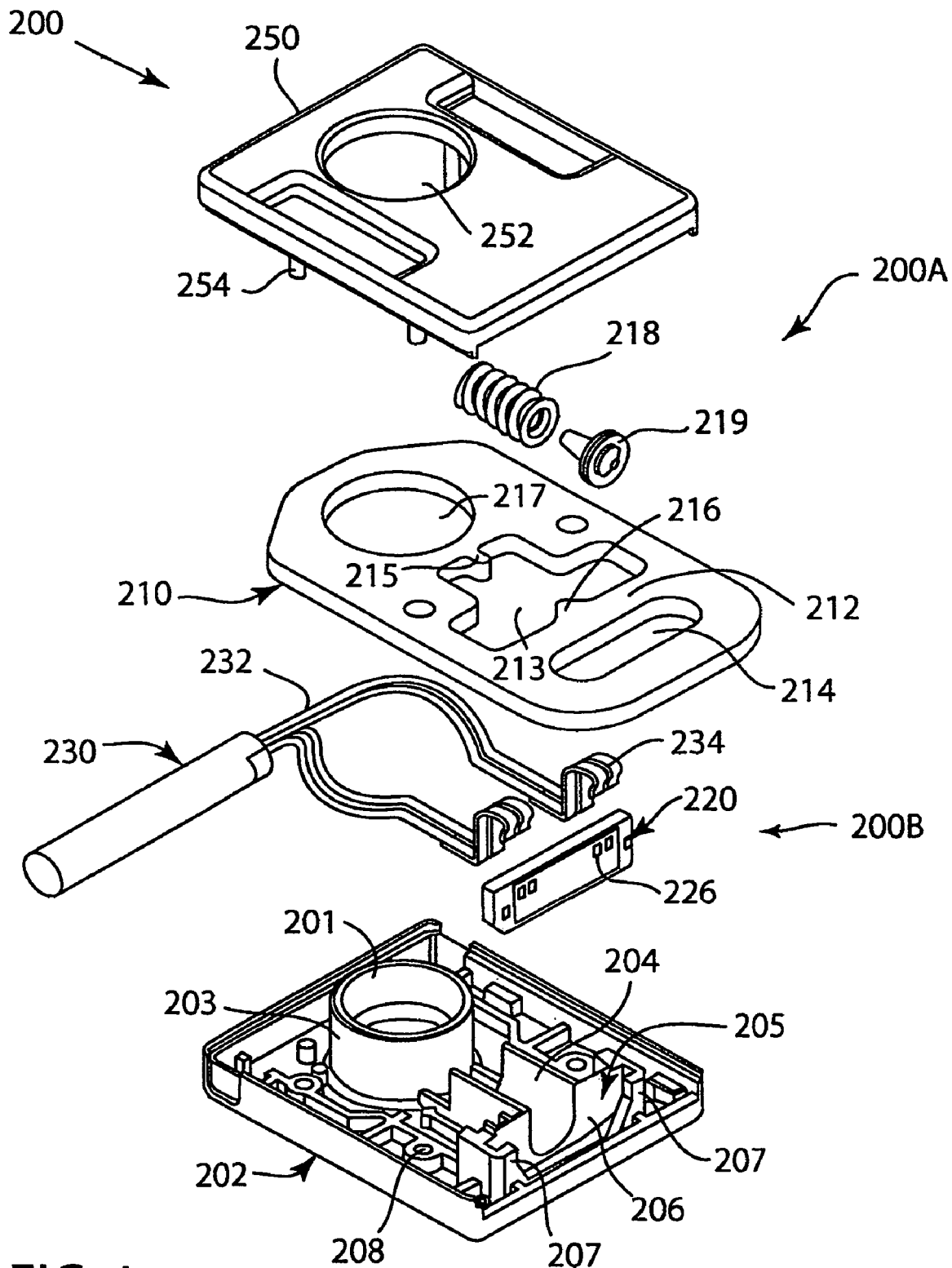
FIG. 4 is a perspective exploded view of an alternative embodiment of a seat belt tension sensor according to the present invention.
Figure 5:
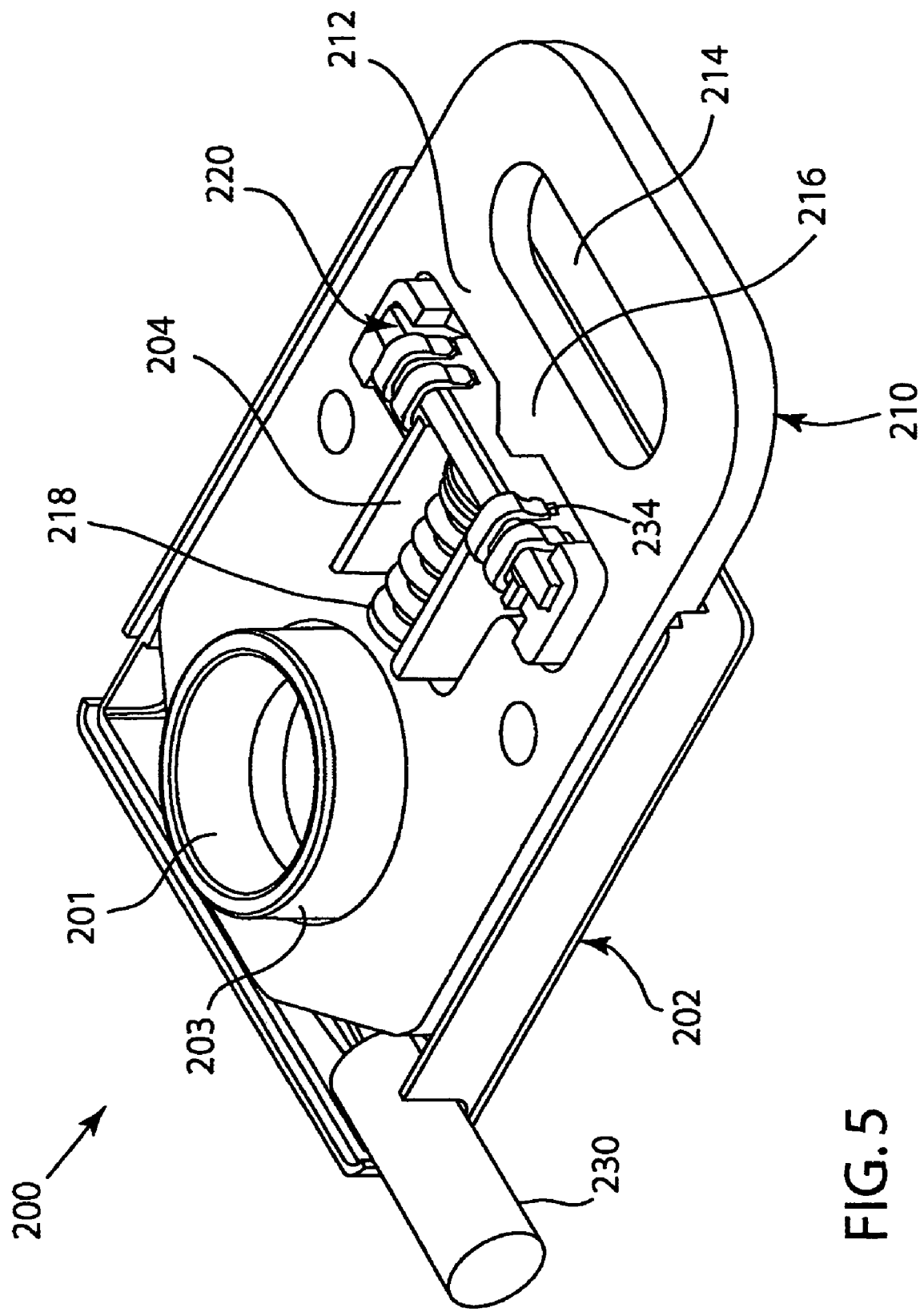
FIG. 5 is a perspective assembled view of the sensor of FIG. 4 without the cover.
Figure 6:
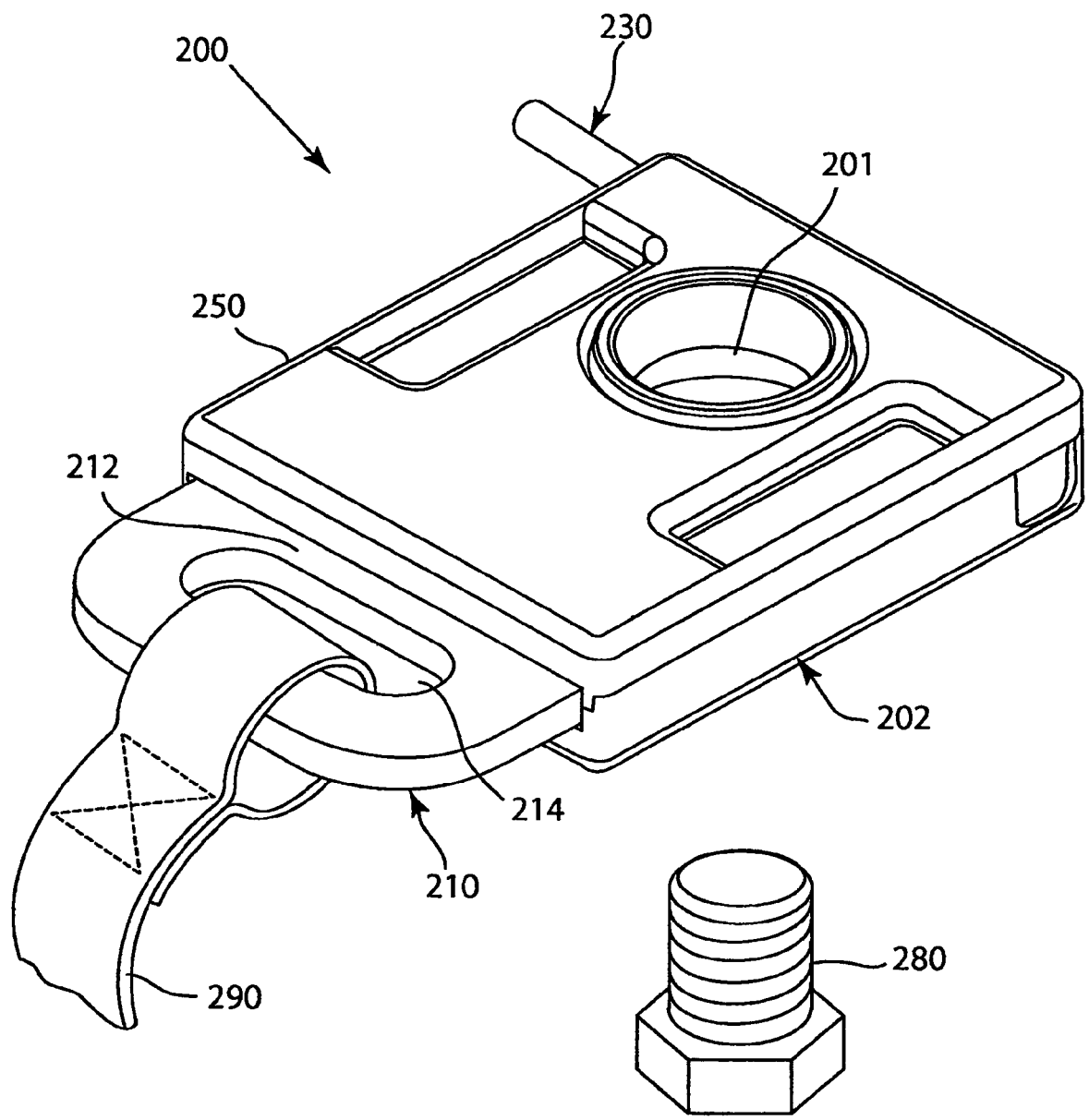
FIG. 6 is a perspective assembled view of the sensor of FIG. 4 with the cover.

FIGS. 4-6 show an alternative embodiment of a seat belt tension sensor assembly 200. Assembly 200 comprises a limit structure 200A and a sensor 200B. Limit structure 200A includes a first plate 202 in the form of a housing, a second plate 210 defining a seat belt anchor, a cover 250, and a strain sensor or member 220. Housing 202 defines an aperture 201, a flange or collar 203, a spring channel 204, walls 206 and 207 defining a strain member slot 205, and apertures 208. Anchor plate 210 is loosely fitted within housing 202. Anchor plate 210 includes an arm 212 defined between first and second cutouts 213 and 214 respectively. Seat belt webbing 290 is anchored on plate 210 through cutout 214. A pair of opposed, co-linear projections 215 and 216 extend into first cutout 213 from opposed interior walls of plate 210. An interior wall of anchor plate 210 defines a mounting aperture 217. A spring 218 is mounted in channel 204 of housing 202. One end of spring 218 is mounted over projection 215. Sensor 200B has a strain member 220 that is mounted in slot 205. A support or pin 219 fits into one of the ends of spring 218. Pin 219 rests adjacent a surface of strain member 220 and serves to even out the forces from spring 218 on strain member 220. Spring 218 is pre-compressed between anchor plate 210 and strain member 220 such that pin 219 is urged against strain member 220. Spring 218 is preferably pre-compressed to 35 pounds of force.

A wire harness 230 has several wires 232 that end in terminals 234. Terminals 234 clip over connector pads 226 on member 220. A cover 250 defines an aperture 252 and projections 254. Projections 254 mate with apertures 208 to snap fit cover 250 to housing 202. Seat belt tension sensor 200 is attached to a vehicle floor (not shown) by a fastener 280 such as a bolt. Fastener 280 extends through apertures 201, 217 and 252.

Figure 7:
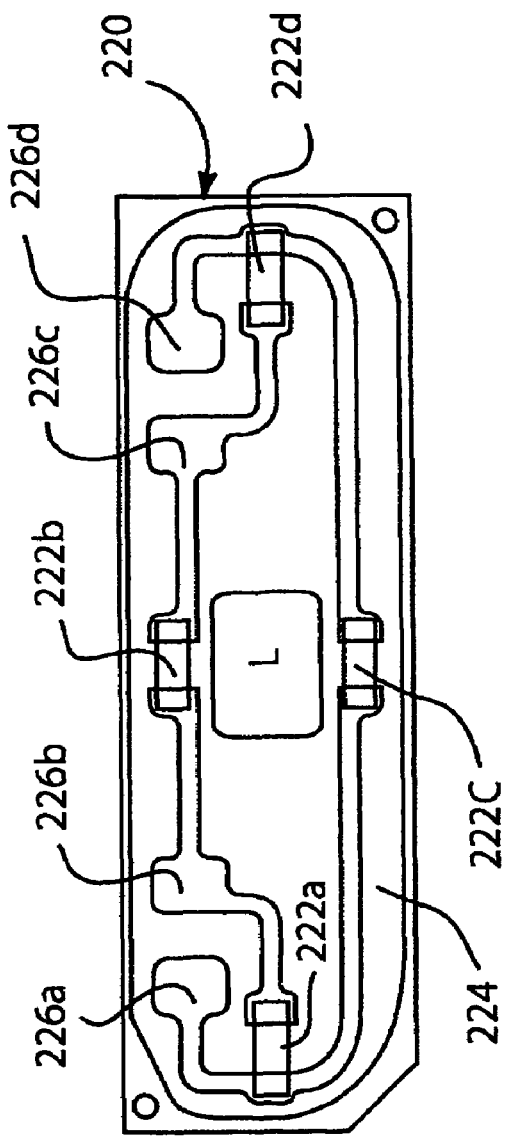
FIG. 7 is a side view of the strain member of the sensor of FIG. 4.
Figure 8:
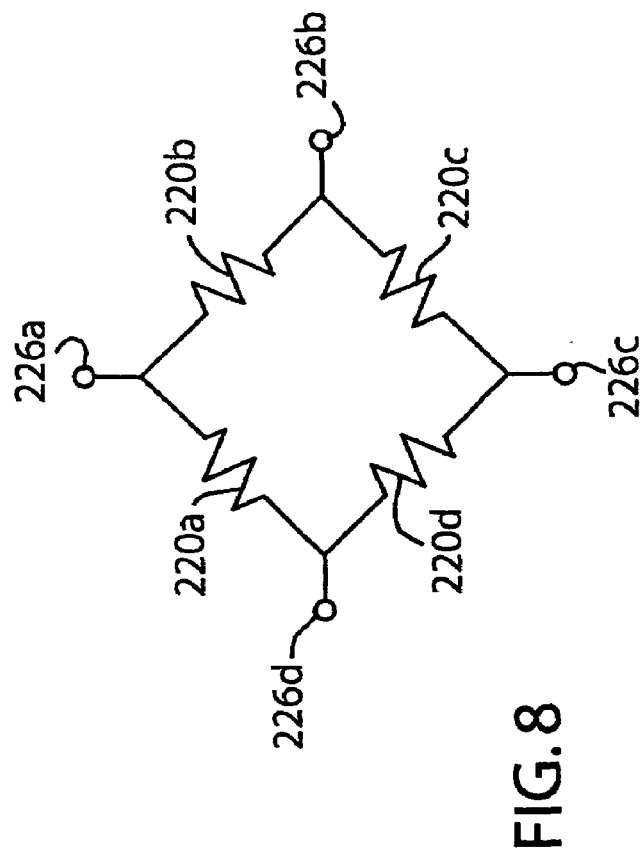
FIG. 8 is a schematic diagram of the wheatstone bridge circuit of the sensor of FIG. 4.
Figure 10:
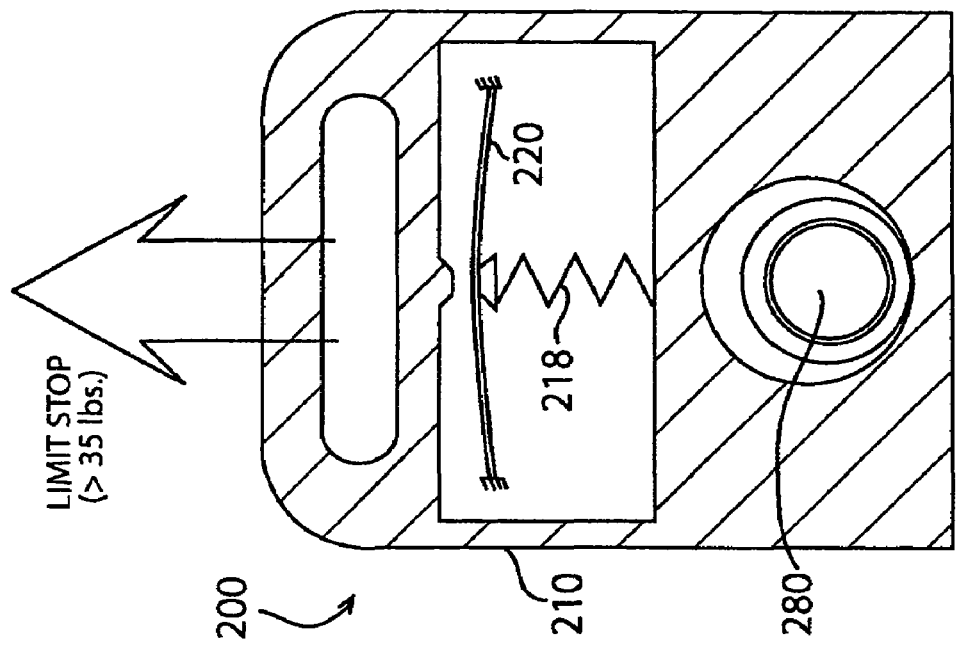
FIG. 10 is a top elevational view of the seat belt tension sensor of FIG. 5 in its fully loaded state.
Figure 9:
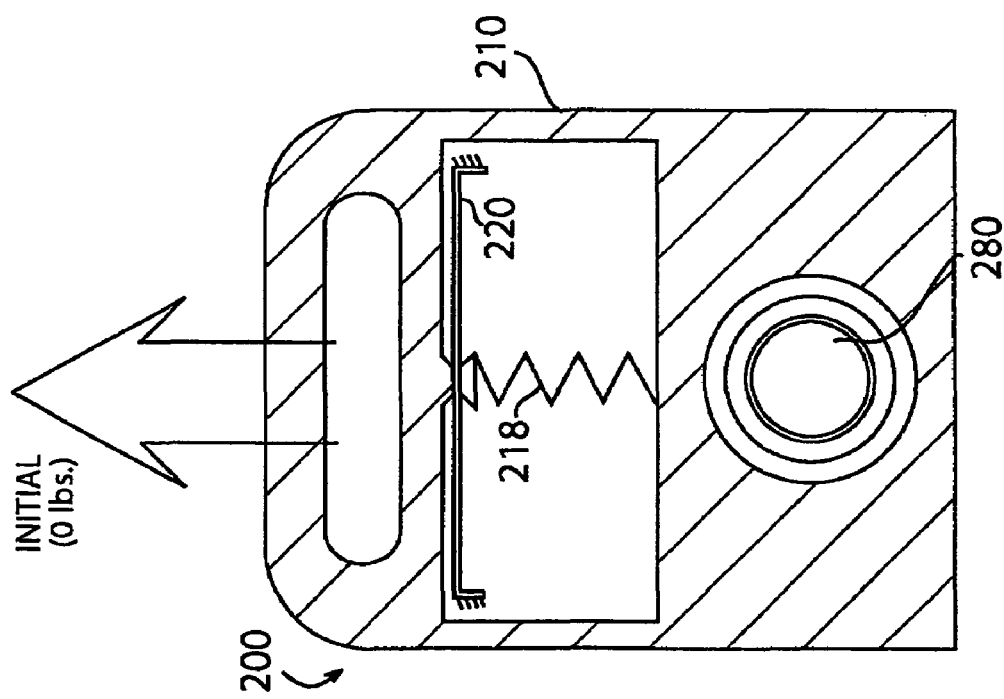
FIG. 9 is a top elevational view of the seat belt tension sensor of FIG. 5 in its unloaded state.

Strain member 220, shown in FIGS. 7 and 8, is formed of a material capable of carrying the tension applied by spring 218 when the seat belt is tightened. Preferably, the strain member 220 is formed of 430 stainless steel. The strain member 220 includes strain-sensitive resistors 222a, b, c, d formed thereon. These are formed by first screening a dielectric layer 224 onto the steel. The strain member 220 is then kiln fired at 850° C. Next, electrically conductive traces 225 and connector pads 226a, b, c, d are similarly screened onto the strain member 220. The strain member 220 is again kiln fired at 850° C. The strain sensitive resistors 222a, b, c, d are next screened onto the strain member 220 in positions defined by the electrically conductive traces 225. The strain member 220 is again kiln fired at 850° C. At this point, a final coating of a covercoat or epoxy can be applied to protect the electrical components of strain member 220. This coating is not required but may be desirable in circumstances where high abrasion or contaminants are expected. It should be noted that the strain-sensitive resistors 222a, b, c, d and connector pads 226a, b, c, d together form the wheatstone bridge circuit of FIG. 8.

Turning to FIGS. 4-5 and 9-10, when a tension is applied to seat belt 290, anchor plate 210 moves relative to the housing 202 and, more specifically, in the direction of the collar 203 and causes spring 218 to apply a bending or flexing pressure to the center of the strain member 220. As the tension increases, substrate 852 flexes and the strain-sensitive resistors 222 change resistance resulting in an electrical output signal that changes in proportion to the amount of strain in seat belt 290. This electrical signal is provided to an external electrical circuit by wire harness 230.

In a collision situation, the force applied to the seat belt overcomes the spring resistance, and the interior wall of anchor plate 210 defining mounting aperture 217 moves to rest against the exterior face of the wall defining flange 203, thus limiting and arresting the movement of the plate relative to the housing 202. Fastener 280 passes through aperture 201 and is adjacent to flange 203. The force from the seat belt is transferred successively from the plate 210, to the flange 203, and then to fastener 280 which is attached to a vehicle floor. Thus, the force is transferred from the seat belt to the vehicle floor. In this way, no further tension is applied to the strain member 220 and the strain member 220 is thus protected from excessive forces by limit structure 220A.

Figure 11:
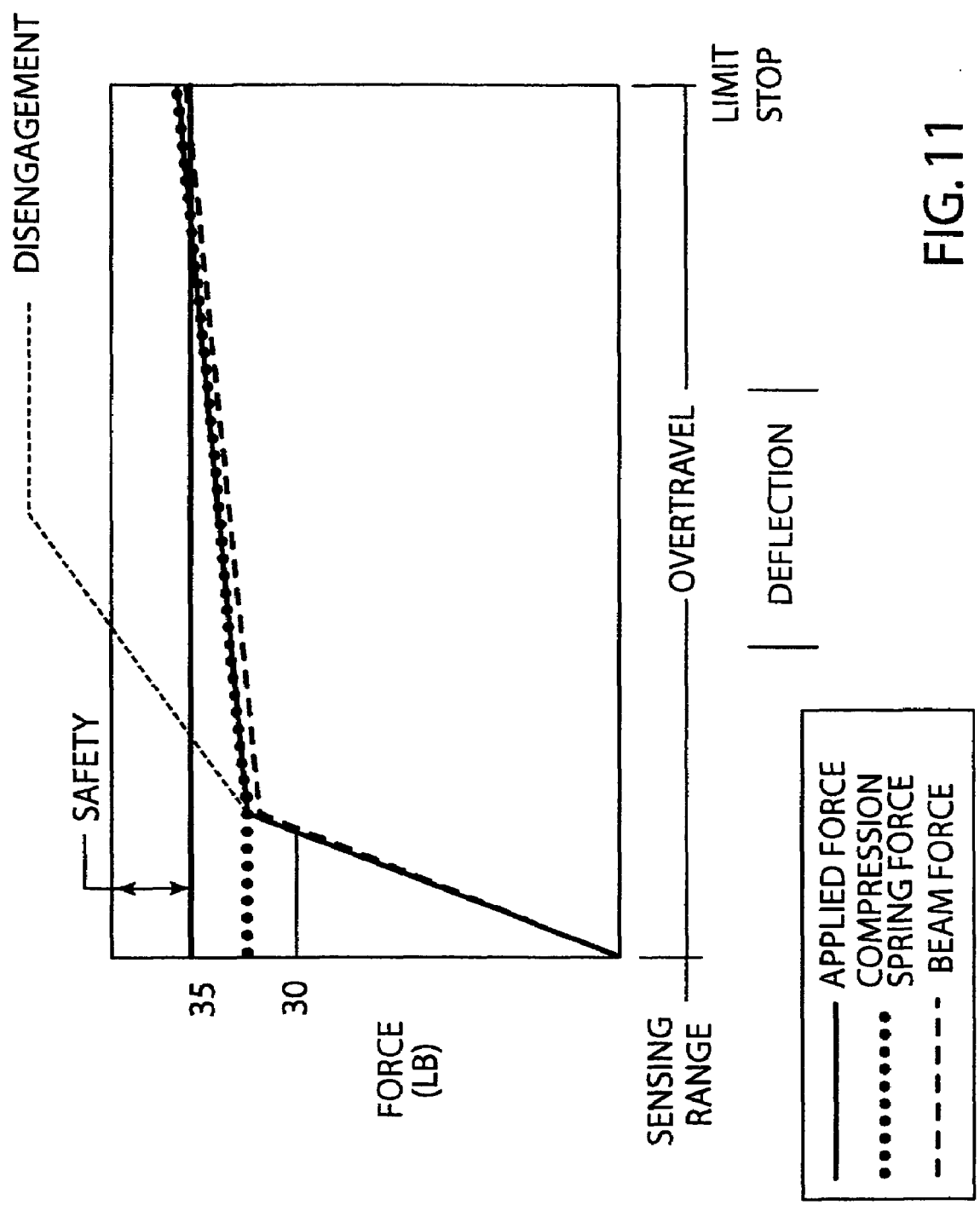
FIG. 11 is a graph of force versus travel for the seat belt tensor sensor of FIG. 5.

A graph showing force versus travel for sensor 200 is provided in FIG. 11. Note that the graph varies linearly up to the point of overtravel at which point it flattens indicating and overtravel condition. The output limit is set for the point at which the fastener 280 engages against the anchor plate 210.

Second Alternative Embodiment

Figure 12:
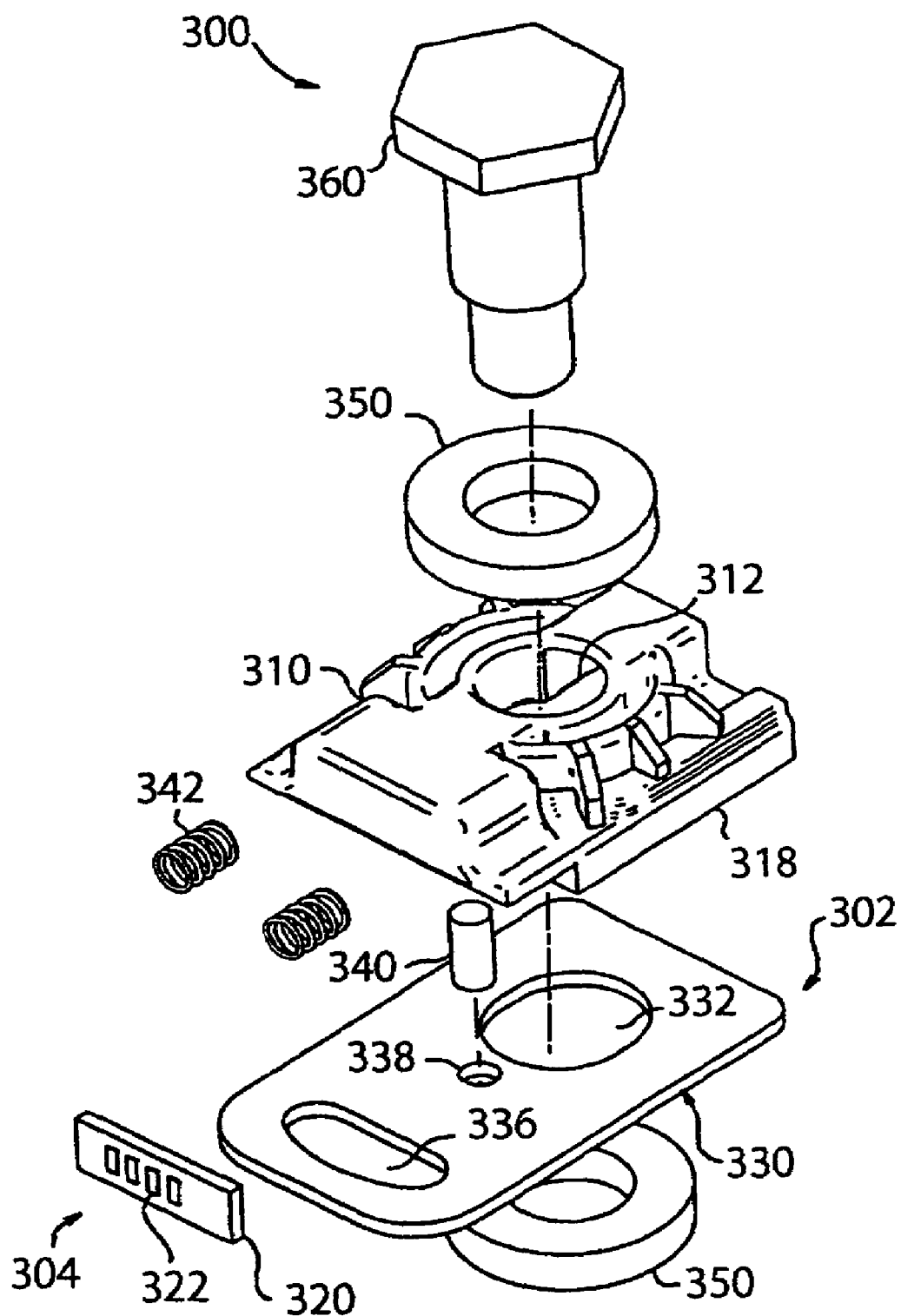
FIG. 12 is an exploded perspective view of another alternative embodiment of a seat belt tension sensor according to the present invention.
Figure 13:
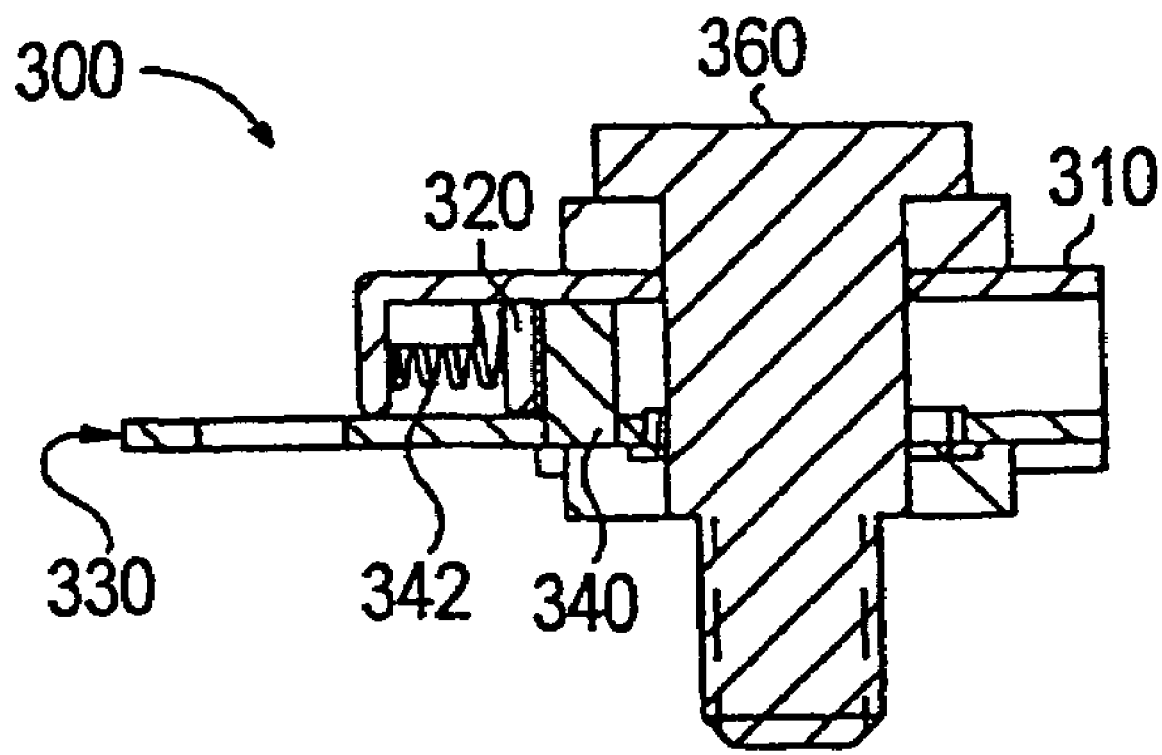
FIG. 13 is a vertical cross-sectional view of the seat belt tension sensor of FIG. 12.
Figure 14:
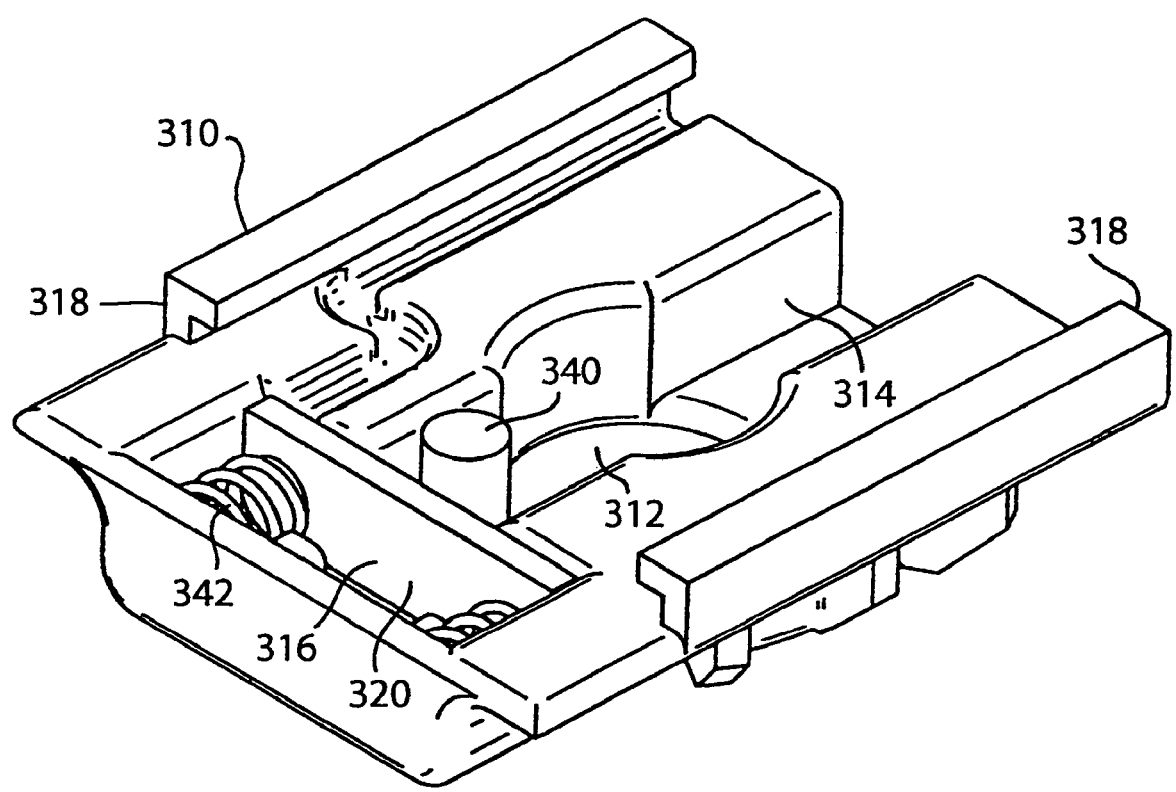
FIG. 14 is a perspective view of the seat belt tension sensor of FIG. 12.

FIGS. 12-14 show another seat belt tension sensor assembly 300. Assembly 300 comprises a limit structure 302 and a sensor 304. Limit structure 302 includes a first plate 310 defining a housing, a second plate 330 defining a seat belt anchor, an actuator pin 340, and bolt 360. Housing 310 has an aperture 312, a channel 314, rails 318 and strain member slot 316. Anchor plate 330 is slidably retained within housing 310 by rail 318. Anchor plate 330 defines a cutout 336 at one end, an outer aperture 338 and a mounting aperture 332 at the other end. Seat belt webbing is adapted to be attached through cutout 336. A pair of springs 342 are mounted in slot 316. Sensor 304 has a strain member 320 with resistors 322 that are mounted in slot 316. Actuator pin 340 rests against the backside of strain member 320. A pair of foam washers 350 are included in the installation of the sensor to reduce vibration noise and allow axial offset loads.

The foam washers allow the seat belt tension sensor to flex slightly depending on the direction of pull on the seat belt webbing.

Seat belt tension sensor 300 is attached to a vehicle floor or seat (not shown) by a fastener 360 such as a bolt. Fastener 360 extends through apertures 312 and 332.

Strain member 320 is similar to strain member 220, shown in FIGS. 7 and 8. When a tension is applied to the seat belt webbing, anchor plate 330 causes pin 340 to apply pressure to the center of the strain member 320. As the tension increases, the strain sensitive resistors 322 will change resistance resulting in an electrical output signal that changes in proportion to the amount of strain in the seat belt. This electrical signal is provided to an external electrical circuit by a wire harness (not shown).

In a collision situation, the force applied to the seat belt overcomes the spring resistance and the interior wall of anchor plate 330 defining the aperture 332 thereof moves into contact with the outer surface of bolt 360, thus limiting and arresting the movement of the plate 330 relative to the housing 310. The force is transferred from the seat belt to the vehicle floor. In this way, no further tension is applied to the strain member 320 and the strain member 320 is thus protected from excessive forces by limit structure 302.

Third Alternative Embodiment

Figure 15:
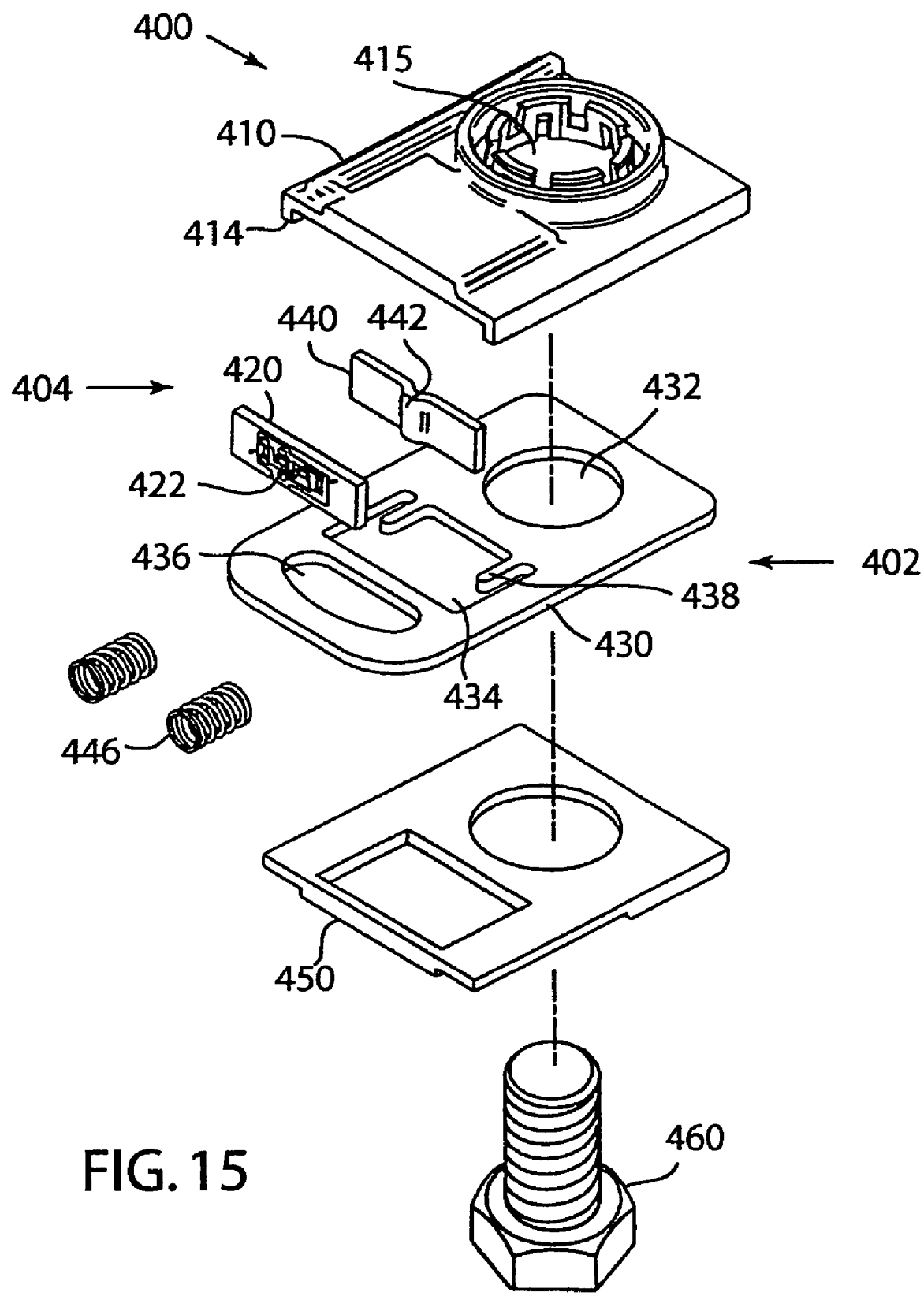
FIG. 15 is an exploded view of yet another alternative embodiment of a seat belt tension sensor according to the present invention.
Figure 16:
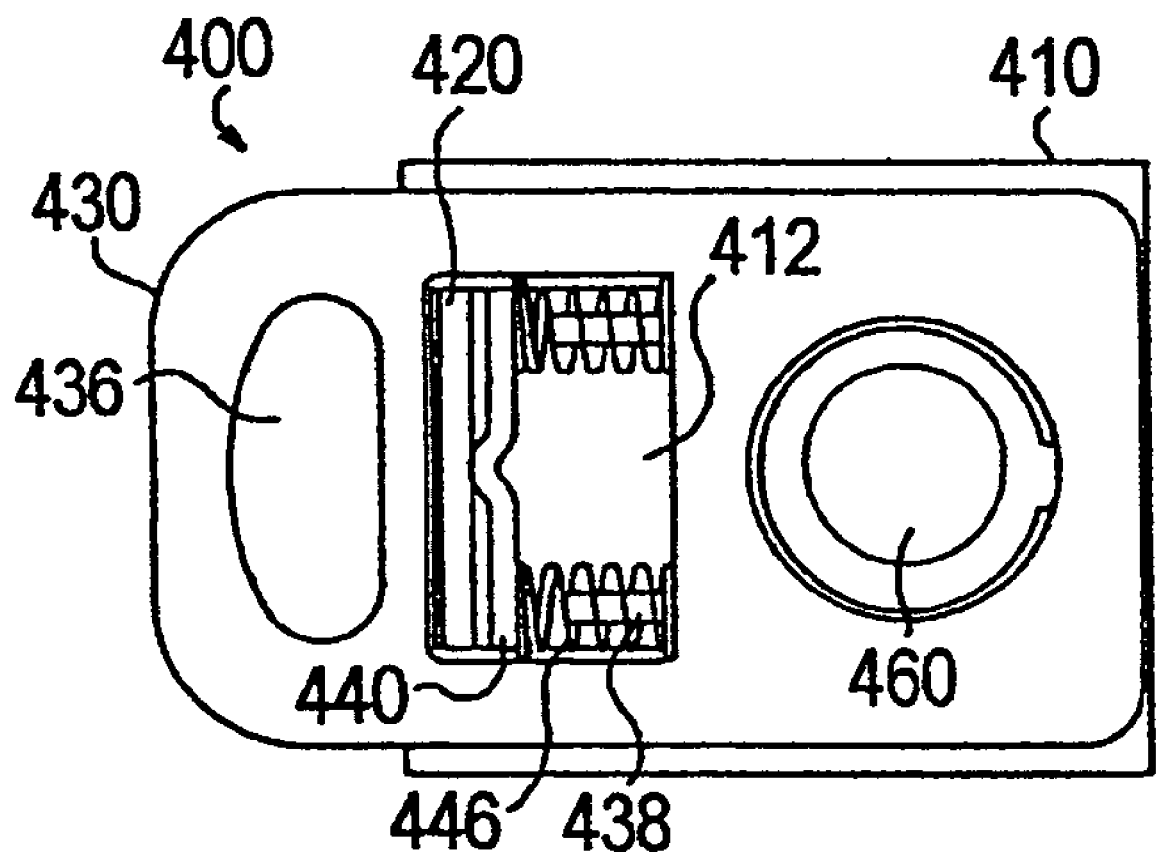
FIG. 16 is a top plan view of the seat belt tension sensor of FIG. 15.
Figure 17:
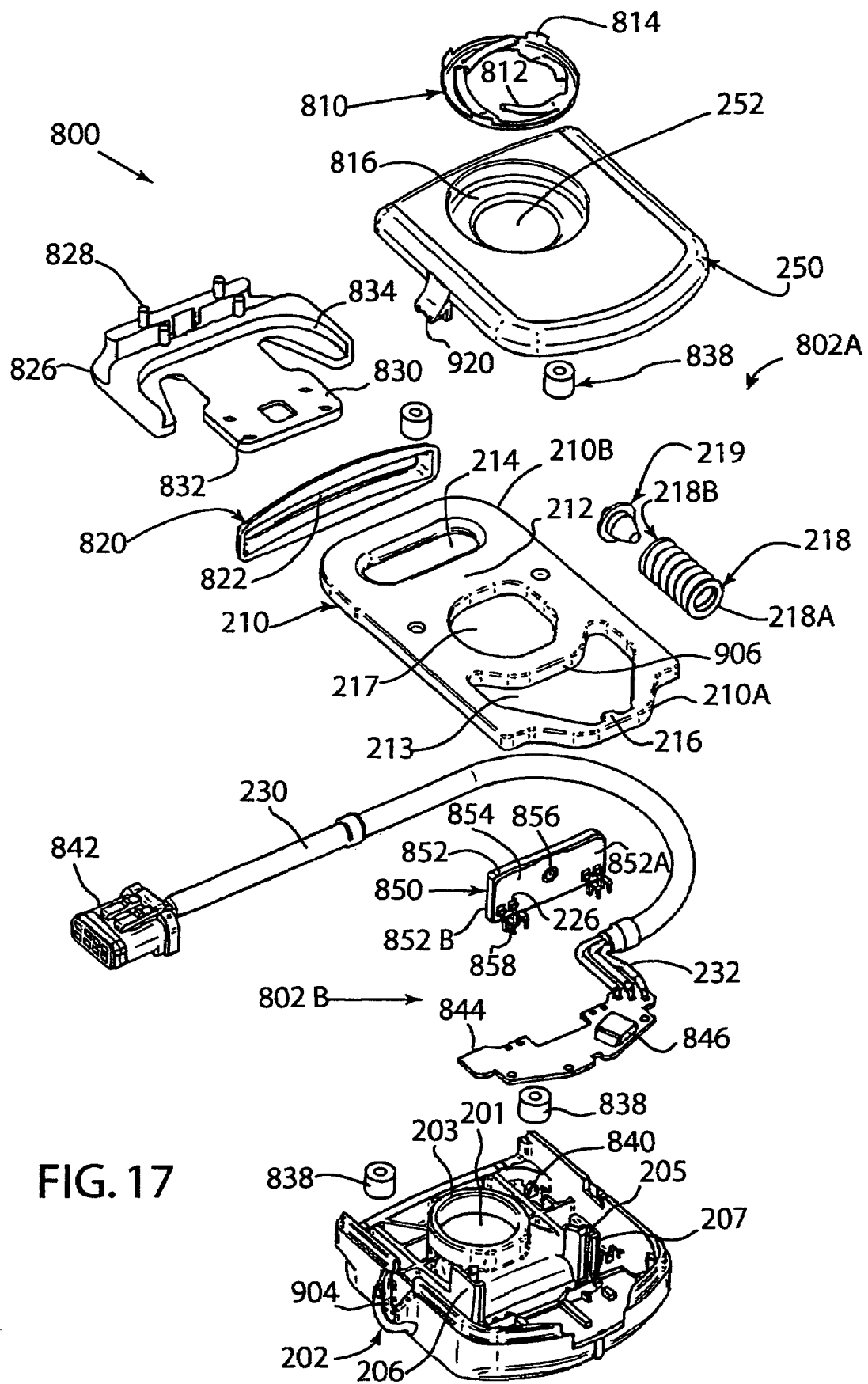
FIG. 17 is a perspective exploded view of a preferred embodiment of a seat belt tension sensor according to the present invention.
Figure 18:
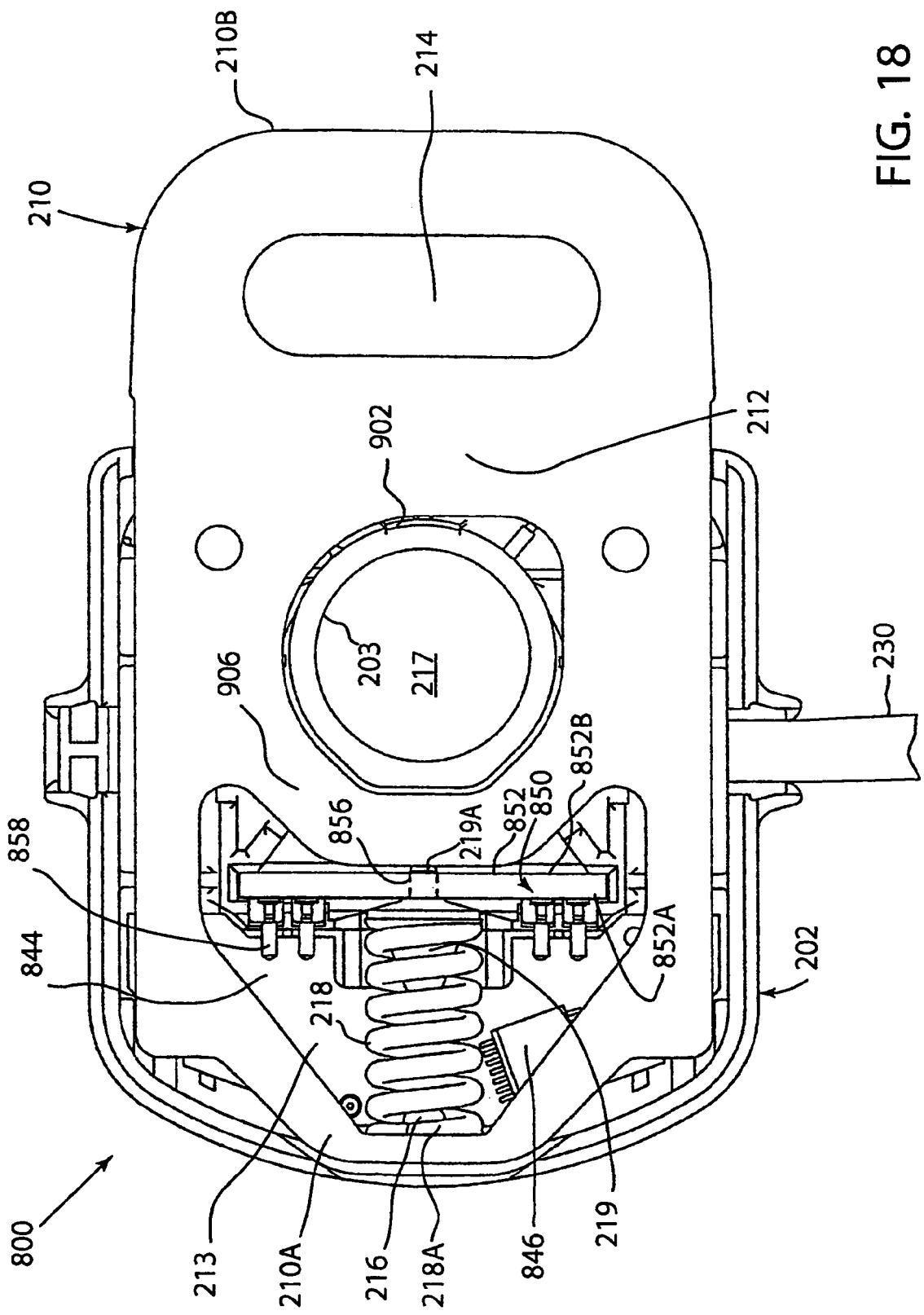
FIG. 18 is a top assembled plan view of the sensor of FIG. 17 without the cover.
Figure 19:
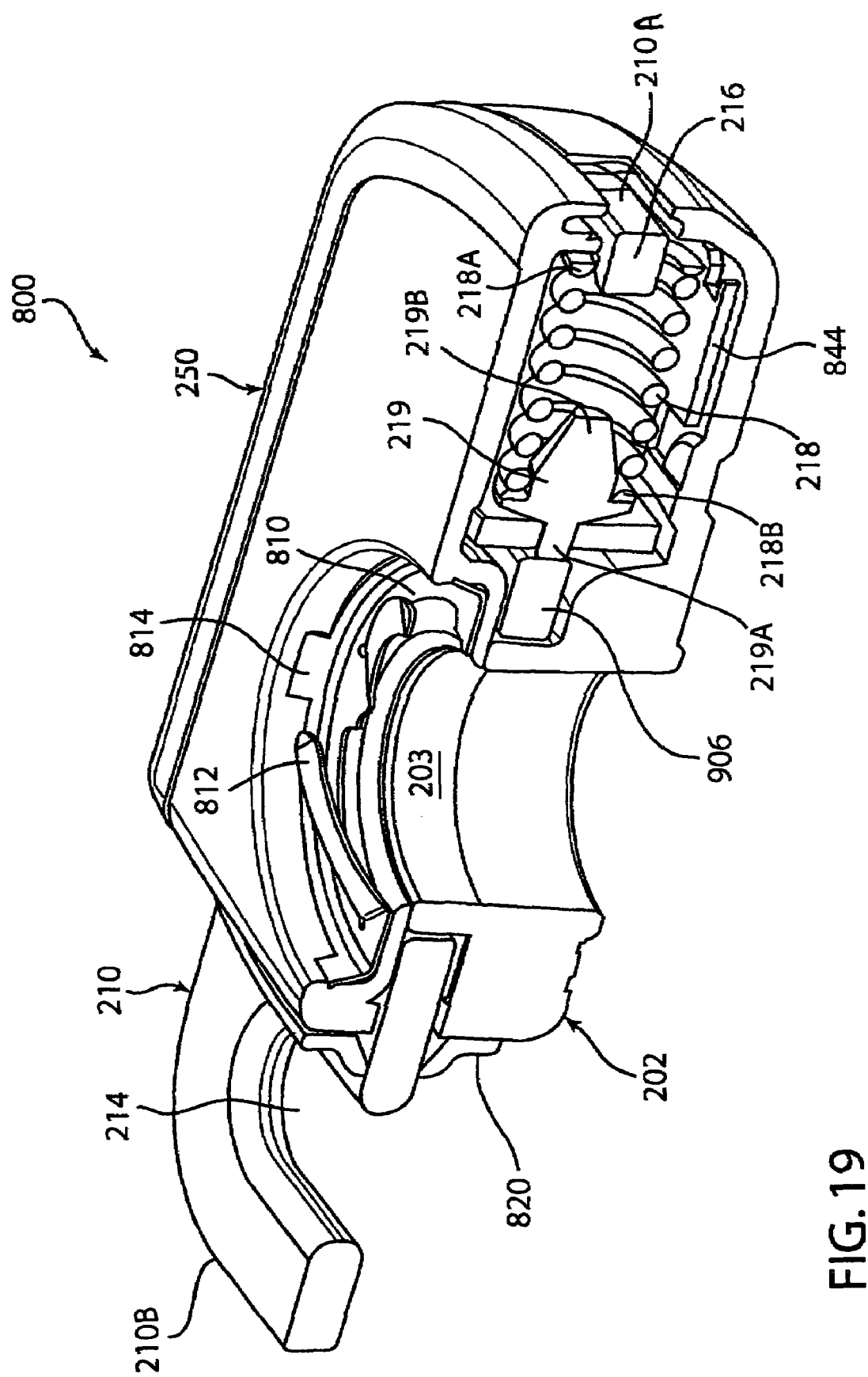
FIG. 19 is a broken perspective view of the sensor of FIG. 17 in an assembled state.
Figure 20:
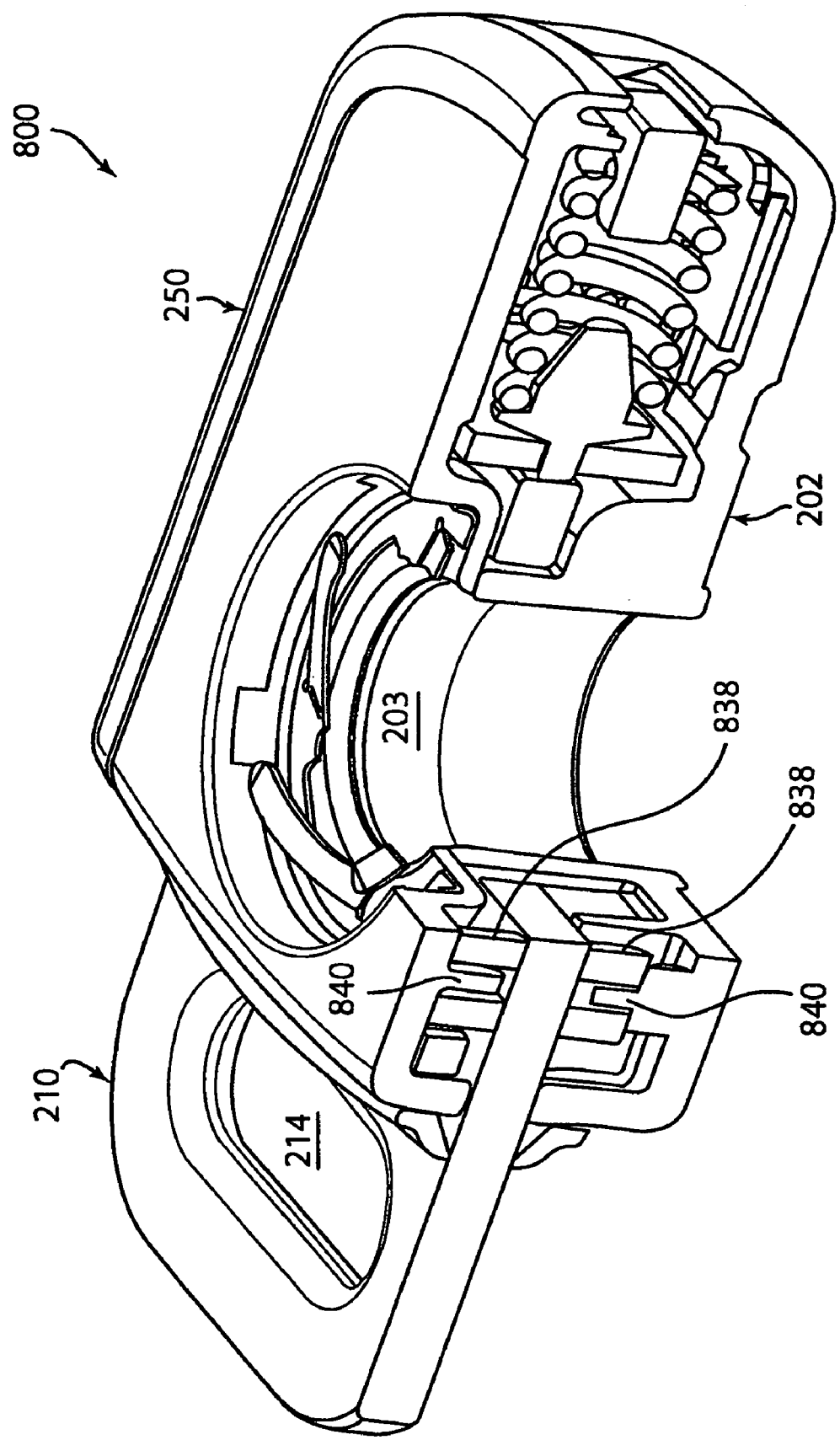
FIG. 20 is another broken perspective view of the sensor of FIG. 17 in an assembled state showing the elastomeric washers.
Figure 21:
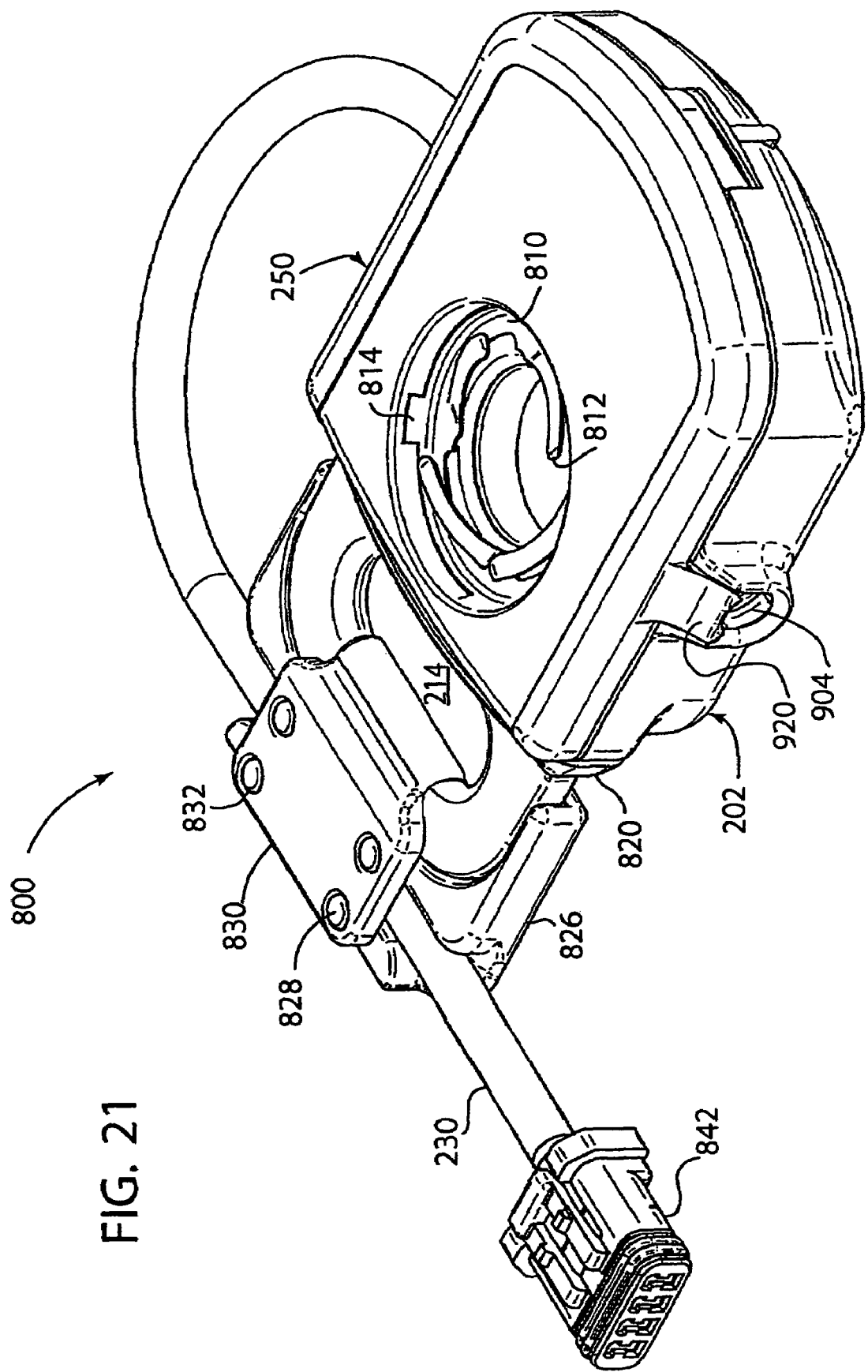
FIG. 21 is a perspective assembled view of the sensor of FIG. 17
Figure 22:
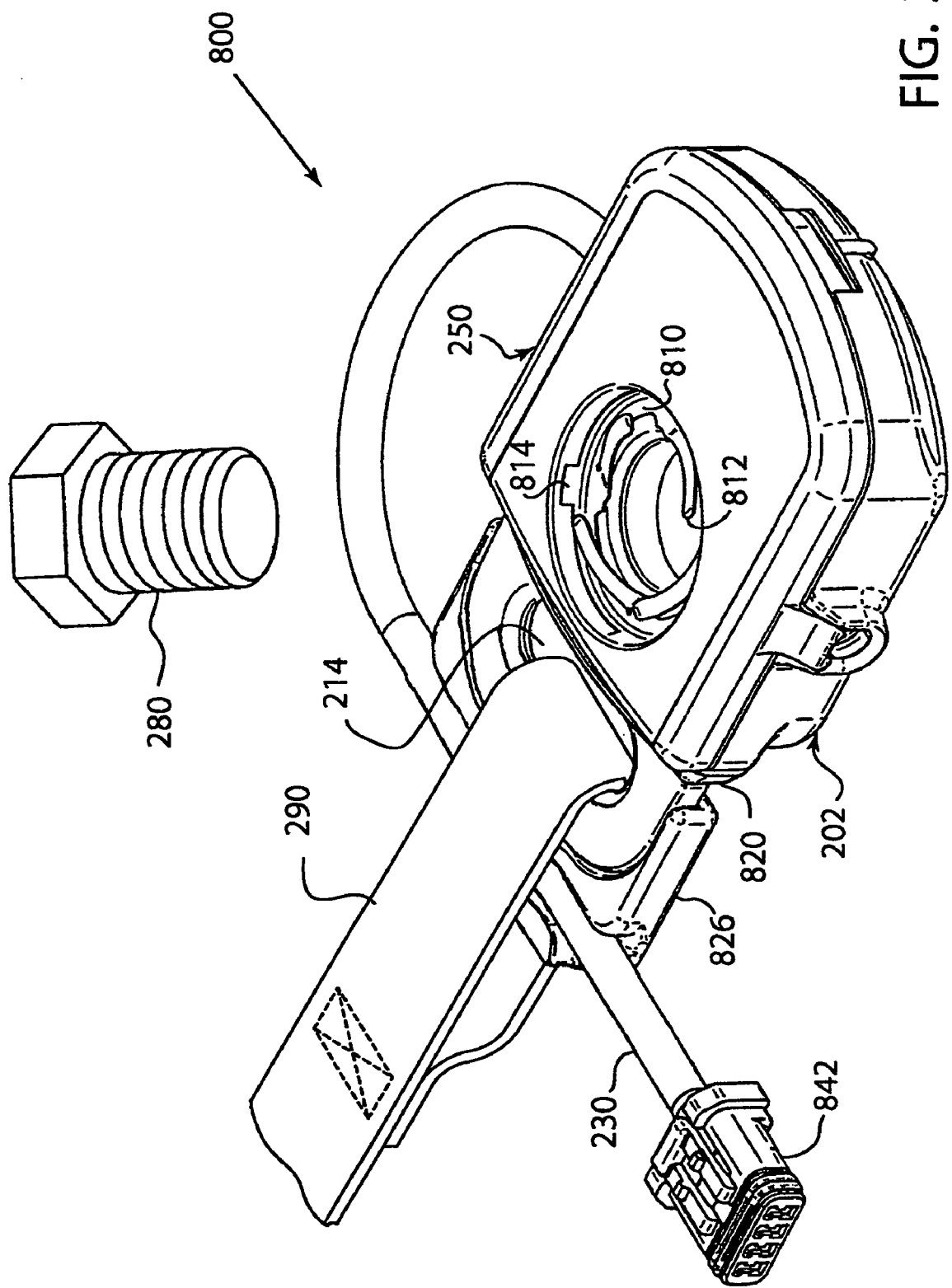
FIG. 22 is a perspective view of the sensor of FIG. 20 with the seat belt and bolt added.

FIGS. 15-16 show another seat belt tension sensor assembly 400. Assembly 400 comprises a limit structure 402 and a sensor 404. Limit structure 402 includes a first plate 410 defining a housing, a second plate 430 defining a seat belt anchor, an actuator bar 440, a cover 450, and a bolt 460. Housing 410 defines an aperture 412 and rails 414. Anchor plate 430 is slidably retained within housing 410 by rails 414. Anchor plate 430 defines a first cutout 436, a second cutout 434, a pair of projections 438, and a mounting aperture 432. Seat belt webbing is adapted to be fitted through and attached to cutout 436. A pair of springs 446 are slid onto projections 438. Sensor 404 has a strain member 420 with resistors 422 that are mounted in cutout 434. Actuator 440 has a bump 442 that rests against the backside of strain member 420. Several fingers 416 are attached to housing 410 around aperture 415. The fingers grip around fastener 460 and allow axial offset loads. The fingers 416 allow the seat belt tension sensor to flex slightly depending on the direction of pull on the seat belt webbing.

Seat belt tension sensor 400 is attached to a vehicle floor or seat (not shown) by a fastener 460 such as a bolt. Fastener 460 extends through apertures 415 and 432.

Strain member 420 is similar to strain member 220, shown in FIGS. 7 and 8. When a tension is applied to the seat belt webbing, anchor plate 430 compresses spring 446 to apply pressure to actuator 440 that allows bump or projection 442 to apply pressure to the center of the strain member 420. As the tension increases, the strain-sensitive resistors 422 will change resistance resulting in an electrical output signal that changes in proportion to the amount of strain in the seat belt. This electrical signal is provided to an external electrical circuit by a wire harness (not shown).

In a collision situation, the force applied to the seat belt overcomes the spring resistance and the interior wall of anchor plate 430 defining the aperture 432 thereof moves into contact against bolt 460 to limit and, more specifically, arrest the movement of plate 430 relative to plate 410. The force is transferred from the seat belt to the vehicle floor. In this way, no further tension is applied to the strain member 420, and the strain member 420 is thus protected from excessive forces by limit structure 402.

VARIATIONS OF THE PREFERRED EMBODIMENTS

Although the application discloses the use of a sensor comprising a plurality of strain gage resistors, one skilled in the art will realize that the preferred embodiment would work with other types of sensors. For example, discrete chip resistors could be attached or foil type strain gages could be used. Furthermore, the shape of the sensor could be varied to any configuration that would transfer the weight from the seat belt.

Another variation of the seat belt tension sensor would be to utilize electrical connections other than a wire harness. For example, a connector or terminals could be added.

Yet a further variation would be to place signal-conditioning circuitry on hub 22 or strain member 200 to amplify and filter the electrical signal before it is transmitted to the airbag controller.

The seat belt tension sensor shown was mounted between a seat belt and a vehicle member. One skilled in the art will realize that the preferred embodiment could be mounted to various locations on the seat or vehicle interior. For example, the seat belt tension sensor could be attached to the vehicle roof.

The illustrated embodiment showed the use of the seat belt tension sensor in an automobile seat. It is contemplated to utilize the seat belt tension sensor in other occupant-sensing applications such as chairs, sofas, scales, beds and mattresses, hospital equipment, cribs, airplane seats, train seats, boat seats, amusement rides, and theater seats.

Fourth Alternative Embodiment

FIGS. 17-25 depict yet another seat belt tension sensor assembly embodiment 800 shown. Assembly 800 comprises a limit structure 802A and a sensor 802B. Limit structure 802A includes a first plate 202 which has been shaped and configured to define a housing for a second plate 210 which defines a seat belt anchor, and a cover 250. Housing 202 has an aperture 201, flange 203, walls 206 and 207 that define a strain gage slot 205, posts 840, a recess 904, and a reverse stop 902. Housing 202 is preferably molded from plastic. Anchor plate 210 is loosely fitted within housing 202. Plate 210 has ends 210A and 210B. Anchor plate 210 includes an arm 212 defined between a cutout 213 and a slot 214. Seat belt webbing 290 is anchored on plate 210 through slot 214. A projection 216 extends into the space defined by cutout 213. A rib 906 extends into the space defined by cutout 213 opposite to projection 216. An interior wall in anchor plate 210 defines a mounting aperture 217. A spring 218 is mounted in cutout 213 between strain gage 850 and projection 216. Spring 218 has ends 218A and 218B. End 218A is mounted over projection 216.

Sensor 802B has a strain gage 850. Strain gage 850 has a substrate 852 that is mounted in slot 205 and located within cutout 213 when plate 210 is fitted in housing 202. Substrate 852 has surfaces 852A and 852B. Substrate 852 has an aperture 856 extending therethrough and a cover coat 854. An actuator 219 fits into spring end 218B. Actuator 219 has a projection 219A and an end 219B. End 219B fits into spring end 218B. Projection 219A extends through aperture 856 of strain member 852. The portion of projection 219A extending through strain member 852 contacts the outer wall of rib 906 when the spring 218 is seated in the cutout 213. The spring 218 is pre-loaded or compressed during installation into cutout 213 between projection 216 and substrate 852 to a spring force of 35 pounds.

A wire harness 230 has several wires 232 that are connected to an electronic circuit assembly or printed circuit board 844. A connector 842 is connected to one end of wire harness 230. Wire harness 230 rests in recess 904 as it exits housing 202. Terminals 858 are soldered to connector pads 226 on strain gage 852. The other end of the terminals is soldered into printed circuit board 844. Printed circuit board 844 has electronic components such as signal conditioning electronics 846 mounted to it. The electronic circuit assembly takes the signal from the strain gage and filters and amplifies it before it is transmitted over the wire harness to an airbag controller or another electronic module.

Cover 250 defines an aperture 252 and recess 816. Cover 250 is ultrasonically welded to housing 202. An annular spring ring or washer 810 fits into recess 816. The spring ring 810 has several upwardly extending tines 812. Tangs 814 hold spring ring 810 in recess 816. Spring ring 810 reduces rattling and movement of the housing about the bolt 280 after the sensor is mounted. Spring ring 810 reduces noise in the vehicle interior by biasing the housing away from the bolt head toward the mounting surface.

A cable guide 826 is positioned over a portion of end 210B. Cable guide 826 holds wire harness 230 away from webbing 290. Cable guide 826 has a tab 830 that folds over wire harness 230. Apertures 832 mate with posts 828 that are heat staked to hold tab 830 in place. The curved portion 834 fits over and partially covers end 210B. A seal or shield 820 slips over end 210B and rests against housing 202 and cover 250. Seal 820 has a slot 822 through which the anchor plate 210 is adapted to extend. Seal 820 prevents contamination and liquids from entering the sensor. Cover 250 has a finger 920.

Posts 840 extend upwardly from housing 202 and downwardly from cover 250. A silicone or rubber grommet or washer 838 is mounted on each post 840. Washer 838 is located adjacent and in contact with anchor plate 210. Washer 838 prevents vibration and rattling of the anchor plate 210 in the housing 202.

The seat belt tension sensor 800 is attached to a vehicle structure such as a seat or floor or B pillar (not shown) by a fastener 280 such as a bolt. Fastener 280 extends successively through apertures 252, 217 and 201. Seat belt webbing 290 loops through slot 214 and is sewn in place. Webbing 290 would continue on to wrap around the waist of a vehicle seat occupant or a child seat.

Strain gage 850 is shown in further detail in FIGS. 23 and 24. Preferably, the substrate 852 is formed of 430 stainless steel. The strain gage 850 has strain sensitive resistors 220a, b, c, d formed thereon. Resistors 220a, b, c, d are formed by first screening a dielectric layer 224 onto the steel. The substrate is then kiln fired at 850° C. Next, electrically conductive traces 225 and connector pads 226a, b, c, d are similarly screened onto substrate 852 and kiln fired at 850° C. The strain-sensitive resistors 220a, b, c, d are next screened onto substrate 852 in positions defined by the electrically conductive traces 225 and kiln fired at 850° C. At this point, a final coating of a covercoat or epoxy can be applied to protect the electrical components. This coating is not required, but may be desirable in circumstances where high abrasion or contaminants are expected. It should be noted that the strain-sensitive resistors 220a, b, c, d and connector pads 226a, b, c, d together form the wheatstone bridge circuit of FIG. 24.

When a tension is applied to seat belt 290, anchor plate 210 moves relative to the housing 202 and causes spring 218 to apply a bending or flexing force to the center of the substrate 852. As the tension increases, substrate 852 flexes and the strain-sensitive resistors 220 change resistance resulting in an electrical output signal that changes in proportion to the amount of tension in seat belt 290. This electrical signal is amplified and conditioned by electronic circuitry 844 and is then provided to an external electrical circuit such as an airbag controller by wire harness 230.

Details of the construction and operation of resistors 220 are shown in U.S. patent application Ser. No. 09/441,350, filed Nov. 15, 1999 and titled, "Automobile Seat Having Seat Supporting Brackets with a Stepped Weight Sensor".

The resistors are typically connected in a conventional wheatstone bridge configuration. Resistors 220 are strain-sensitive and will change resistance based on the amount of strain placed on substrate 852.

The actuator projection 219A is in contact with rib 906 preventing direct contact of the rib to surface 852B of substrate 852. During a shock incident, such as when the sensor is dropped prior to installation, the projection 219A located in aperture 856 allows the anchor plate 210 to move away from the seat belt.

Another feature that enhances the shock resistance of sensor 800 is the reverse stop 902 mounted to flange 203. When anchor plate 210 moves backwardly (towards strain gage 850), reverse stop or finger 902 on the back side of flange 203 engages the outside wall of anchor plate arm 212 preventing further backwards movement of plate 210. This assists in keeping rib 906 away from substrate surface 852B. The reverse stop 902 prevents the anchor plate from moving backwards before it hits the strain gage. The reverse stop 902 prevents the backward load from reaching the sensor 850 and protects against shock damage.

The use of projection 219 allows the reverse stop 902 to contact arm 212 before rib 906 hits strain gage 850, therefore preventing damage during the shock incident. In this manner, the strain gage 850 is isolated from the rib 906.

In a high forward load situation, the force applied to the seat belt overcomes the force of spring 218. Then, anchor 210 at rib 906 and the interior wall defining aperture 217 thereof moves in the direction of flange 203 to rest against the outer wall of flange 203. Fastener 280 passes through apertures 201, 217, and 252 and is adjacent to flange 203. Additional force from the seat belt is then transferred to fastener 280 which is attached directly or indirectly to a vehicle mounting point such as the seat or floor. Thus, the additional or overload force is transferred from the seat belt to the vehicle. In this way, no further tension is applied to the strain gage 850 and it is thus protected from excessive forces by the limit structure 802A. When no seat belt tension is applied to anchor plate 210, the spring is compressed to 35 pounds. When rib 906 and the wall of aperture 217 engages flange 203, the spring is compressed to 38 pounds. Any load beyond the 38 pounds is diverted through the flange 203 to bolt 280.

Figure 25:
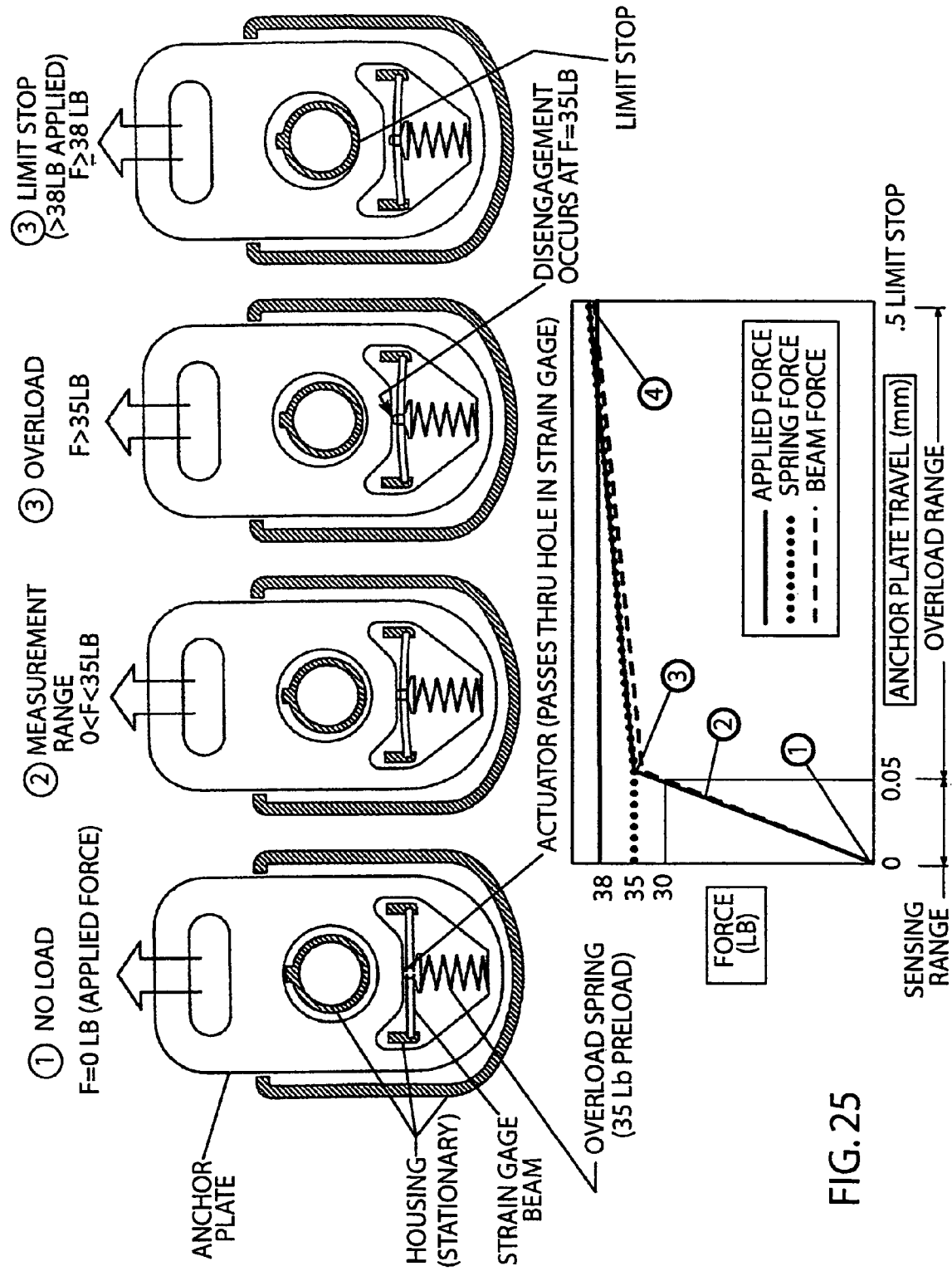
FIG. 25 is a graph of force versus deflection for the seat belt tension sensor of FIG. 17 and a series of diagrams showing the relationship between the anchor plate and housing as the anchor plate moves between its vertical no load condition to its limit stop condition in abutting relationship with the collar of the housing.

A graph showing force versus travel for sensor 800 is provided in FIG. 25. FIG. 25 shows the force versus travel measured at three different locations:

1. The force applied to the sensor on anchor plate 210;
2. The compression spring force on spring 218;
3. The force on strain gage 850.

The applied force is shown increasing from 0 to 38 pounds. The applied force greater than 38 pounds is diverted through flange 203 to bolt 280. The force on spring 218 starts at the pre-compression value of 35 pounds and increases to a maximum of 38 pounds. The force on the strain gage 850 starts at 0 pounds and increases to a maximum of 38 pounds. There is no force applied to the strain gage when no tension is applied on the seat belt webbing.

Note that the graph varies linearly in a sensing range from 0 to 30 pounds. The sensing range increases up to the point of disengagement where projection 219A separates from contact with rib 906. The point of disengagement is about 35 pounds plus or minus a few pounds. Between 30 and 38 pounds of force, the sensor is in the overload range. The curve flattens indicating an overload condition. The limit stop is the point at which the exterior wall of flange 203 contacts rib 906 and the interior wall of aperture 217. Beyond the stop point, all additional force is transferred to fastener 280.

Remarks about the Fourth Alternative Embodiment

The present seat belt tension sensor has several advantages. It provides for isolation from shock events and protects the strain-sensitive resistors. The use of the actuator projection extending through the strain gage prevents the rib of the anchor plate from contacting the backside of the strain gage. This protects the strain gage from damage during a shock incident. The use of the posts and elastomeric washers prevents rattling of the sensor and allows for the sensor to be more quiet in a vehicle. The seat belt tension sensor allows accurate sensing of seat belt tension while, at the same time, providing the structural strength needed for occupant restraint in a crash situation. The seat belt tension sensor further protects the strain gage from excessive loads that could damage the strain gage. The present invention allows an airbag controller to make better decisions as to when and how to deploy an airbag based upon more accurate seat occupant information.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A seat belt tension sensor comprising:
   a housing defining an aperture and a collar;
   a plate adapted to be fitted over the housing, the plate and the housing being adapted for movement relative to one another, the plate defining a slot and a cutout, the slot being adapted to receive a seat belt;
   a sensor located in the cutout, the sensor being adapted to generate an electrical signal indicative of seat belt tension;
   at least one spring coupled between the plate and the housing; and
   a wire harness operably connected to the sensor and extending from the housing.

2. The seat belt tension sensor according to claim 1 wherein the spring biases the plate relative to the housing.

3. The seat belt tension sensor according to claim 1 wherein the housing is fixed and the plate moves relative to the housing.

4. The seat belt tension sensor according to claim 1 wherein movement of the plate and housing relative to one another is limited by the engagement of a portion of the housing with a portion of the plate.

5. The seat belt tension sensor according to claim 4 wherein the slot in the plate is defined by an interior plate wall and the movement of the plate and the housing relative to one another is limited by the engagement between the interior plate wall and the housing collar.

6. The seat belt tension sensor according to claim 1 wherein the movement of the plate and the housing relative to one another causes the compression of the spring.

7. The seat belt tension sensor according to claim 5 wherein the engagement of the interior plate wall with the housing collar defines a load limit and transfer stop.

8. The seat belt tension sensor according to claim 1 wherein a fastener secures the seat belt tension sensor to an interior vehicle mounting structure.

9. The seat belt tension sensor according to claim 8 wherein the fastener is adapted to extend through the housing collar.

10. A seat belt tension sensor comprising:
a plate defining a housing, the plate having a collar;
a seat belt anchor adapted to be fitted in the plate, the anchor having an interior wall defining an aperture;
a sensor associated with the plate and the anchor and adapted to generate an electrical signal that is indicative of seat belt tension;
at least one spring coupled between the plate and the anchor; and
the collar on the plate extending through the aperture in the anchor, the interior wall of the anchor being adapted to engage against the collar to limit movement of the anchor relative to the plate.

11. The seat belt tension sensor according to claim 10 wherein the sensor is at least partially mounted to a printed circuit board.

12. The seat belt tension sensor according to claim 11 wherein a wire harness is connected to the printed circuit board.

13. The seat belt tension sensor according to claim 11 wherein the plate and the anchor define respective stops cooperating to limit movement of the anchor relative to the plate.

14. A seat belt tension sensor assembly comprising:
a housing for a seat belt anchor;
the anchor being fitted in the housing and defining a slot for a seat belt, the anchor being adapted for movement relative to the housing in response to a load exerted thereto by the seat belt;
the housing and the anchor respectively defining respective walls adapted to engage each other to arrest the movement of the anchor relative to the housing;
a sensor adapted to generate an electrical signal in response to the movement of the anchor relative to the housing;
a spring associated with the anchor and adapted for compression in response to the movement of the anchor relative to the housing; and
a wire harness connected to the sensor.

15. The seat belt tension sensor assembly of claim 14 wherein the housing defines an aperture adapted to receive a fastener for securing the housing to a vehicle interior structure.

16. The seat belt tension sensor assembly of claim 14 wherein the housing defines a collar and the anchor defines an aperture and the collar is adapted to extend through the aperture.

17. The seat belt tension sensor assembly of claim 16 wherein the collar defines the housing wall and the aperture in the anchor is defined by the anchor wall.

18. The seat belt tension sensor assembly of claim 14 further comprising a leaf spring structure operably associated with the housing and adapted for deflection in response to the application of tension thereto.

19. A tension sensor assembly comprising:
a housing;
an anchor plate coupled with the housing, the anchor plate having a first opening and a second opening , the second opening adapted to be connected with a belt;
a sensor mounted in the first opening, the sensor adapted to generate an electrical signal that is indicative of seat belt tension; and
at least one spring mounted in the first opening, wherein the anchor plate is adapted to protect the sensor from excess forces applied by the belt.

20. The seat belt tension sensor according to claim 19 wherein the spring biases the plate from the housing.

21. The seat belt tension sensor according to claim 19 wherein the sensor is a strain gage.

22. The seat belt tension sensor according to claim 19 wherein the sensor comprises at least one strain sensitive resistor.

* * * * *